US005133051A

United States Patent [19]
Handley

[11] Patent Number: 5,133,051
[45] Date of Patent: Jul. 21, 1992

[54] AUTOMATIC HIGH SPEED PUBLISHING SYSTEM

[76] Inventor: George E. Handley, 5306 W. 119th Ter., Overland Park, Kans. 66209

[21] Appl. No.: 758,477

[22] Filed: Sep. 9, 1991

Related U.S. Application Data

[63] Continuation of Ser. No. 626,989, Dec. 13, 1990, abandoned.

[51] Int. Cl.$^5$ .............................................. G06F 3/14
[52] U.S. Cl. .................................... 395/148; 395/147
[58] Field of Search ................................ 395/144–149

[56] References Cited

U.S. PATENT DOCUMENTS 3,781,816  12/1973  Colement et al. ................. 364/200
4,881,197  11/1989  Fischer .............................. 364/900

OTHER PUBLICATIONS

*Using Microsoft WORD Version 3.0*, Microsoft, 1986 pp. 51–70 and 293–318.

*Using Microsoft WORD 2nd Edition*, Que Corporation, 1987, pp. 72–76 and 269–292.

Primary Examiner—Gary V. Harkcom
Assistant Examiner—Michael A. Jaffe
Attorney, Agent, or Firm—Hovey, Williams, Timmons & Collins

[57] ABSTRACT

A database publishing system uses a plurality of microprocessors for flowing manuscript material such as text and graphics into predefined entities making up the structure of a publication according to predetermined attributes associated with each entity, and for imaging manuscript material in a sequence of processing stages with each stage including a plurality of processing operations. In operation, the structure and appearance of a publication can be defined in advance before entering the manuscript material making up the publication. Furthermore, manuscript material making up a plurality of publications can be in process at the same time in various processing stages in order to image the publications in assembly line fashion.

11 Claims, 24 Drawing Sheets

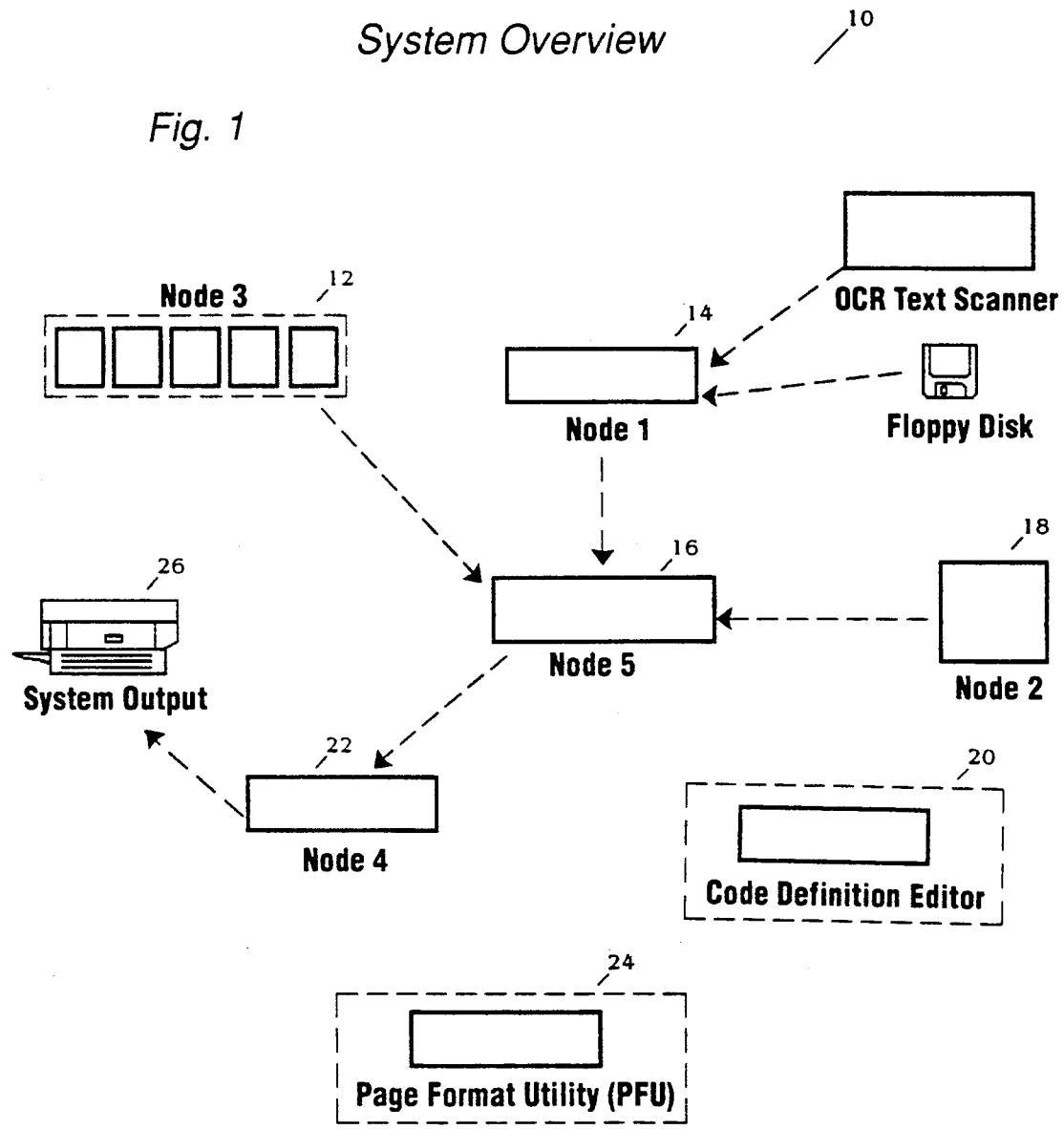

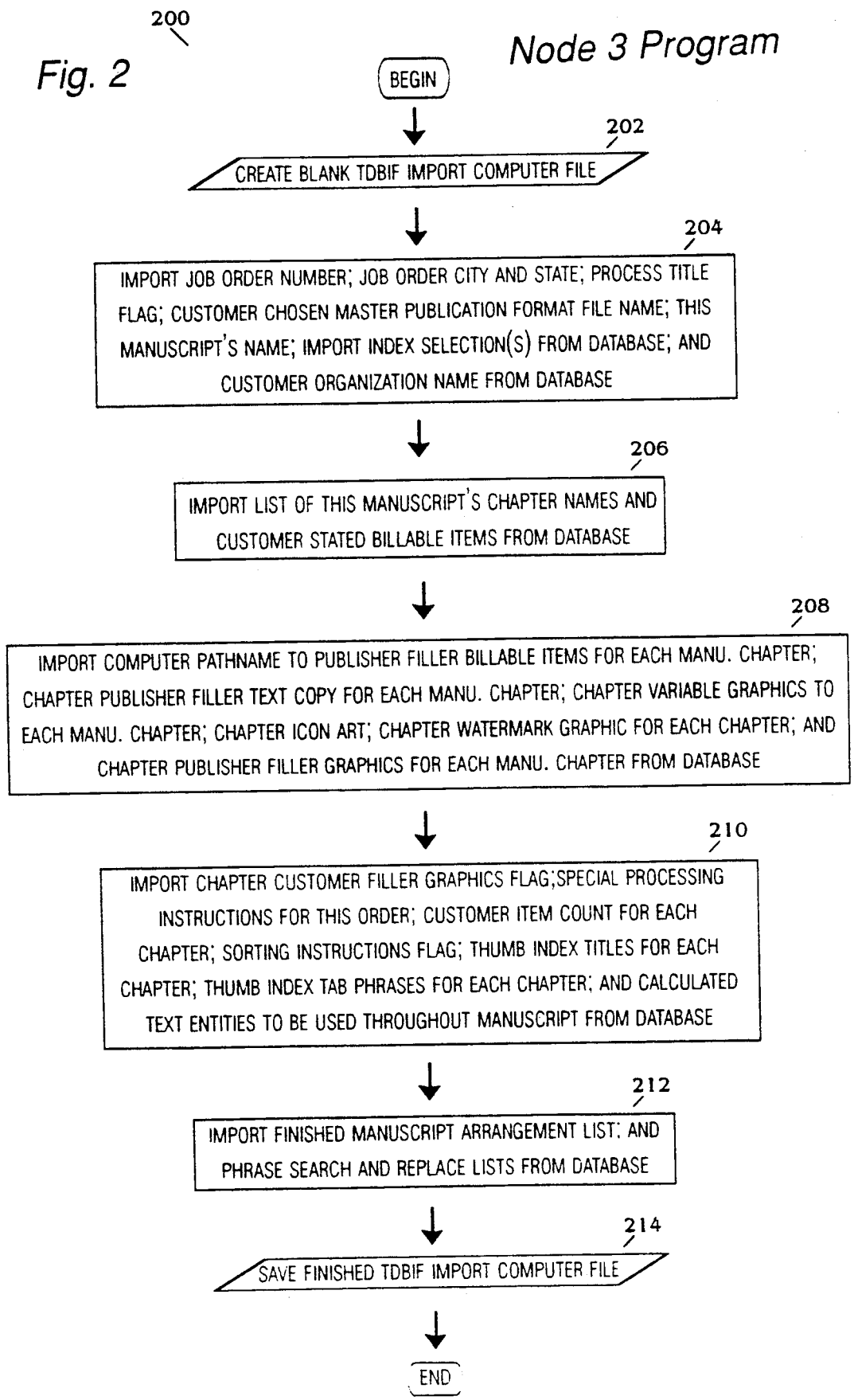

Page Format Utility Program - General Overview

*Page Format Utility Program - General Overview*

*Page Format Utility Program - Phase 1 - "Plate"*

Page Format Utility Program - Phases 2 & 3 - "Page"

*Page Format Utility Program -*
*Fig. 5B*     Phases 2 & 3 - "Page"
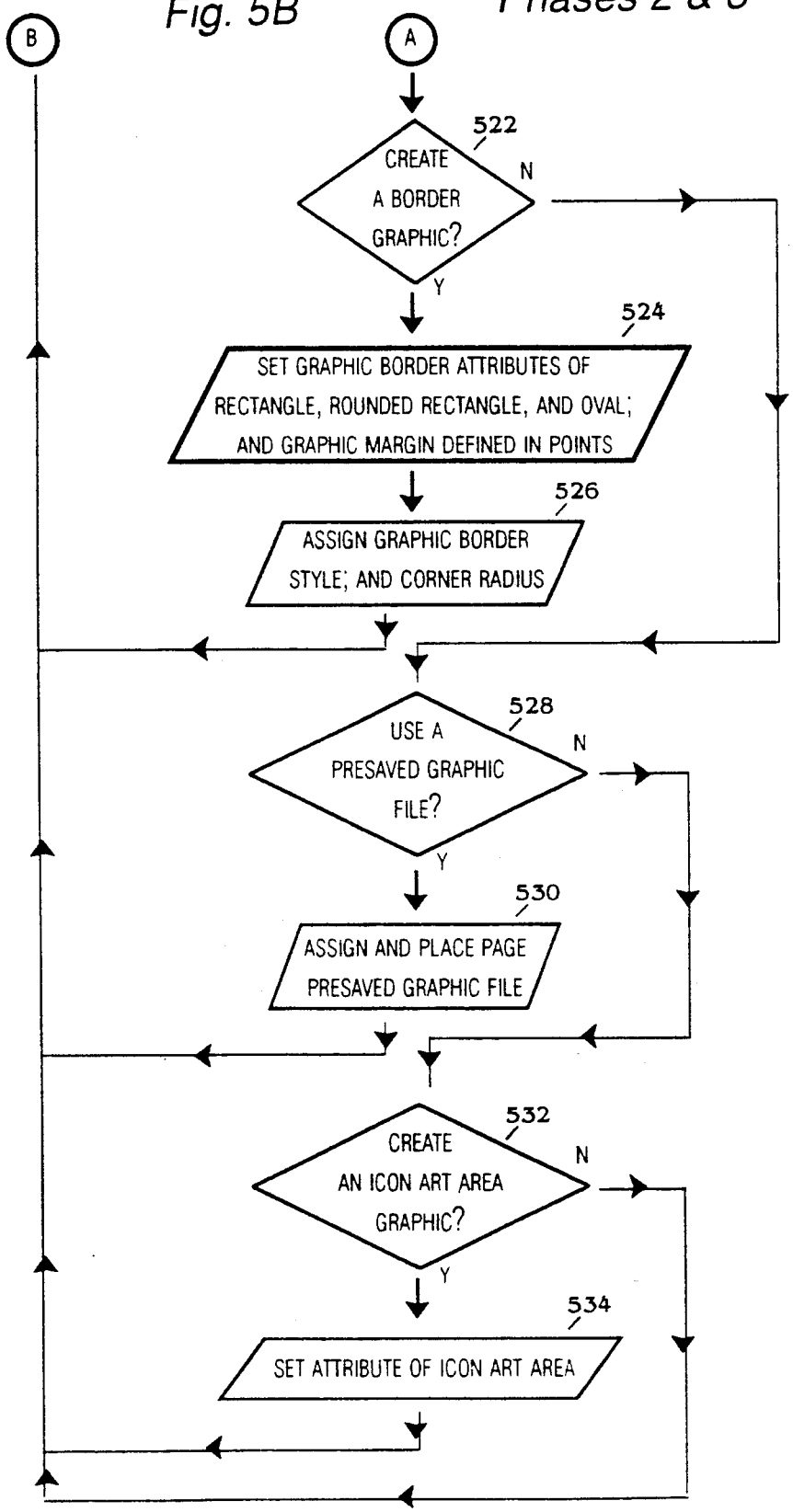

Page Format Utility Program -

Phases 2 & 3 - "Page"

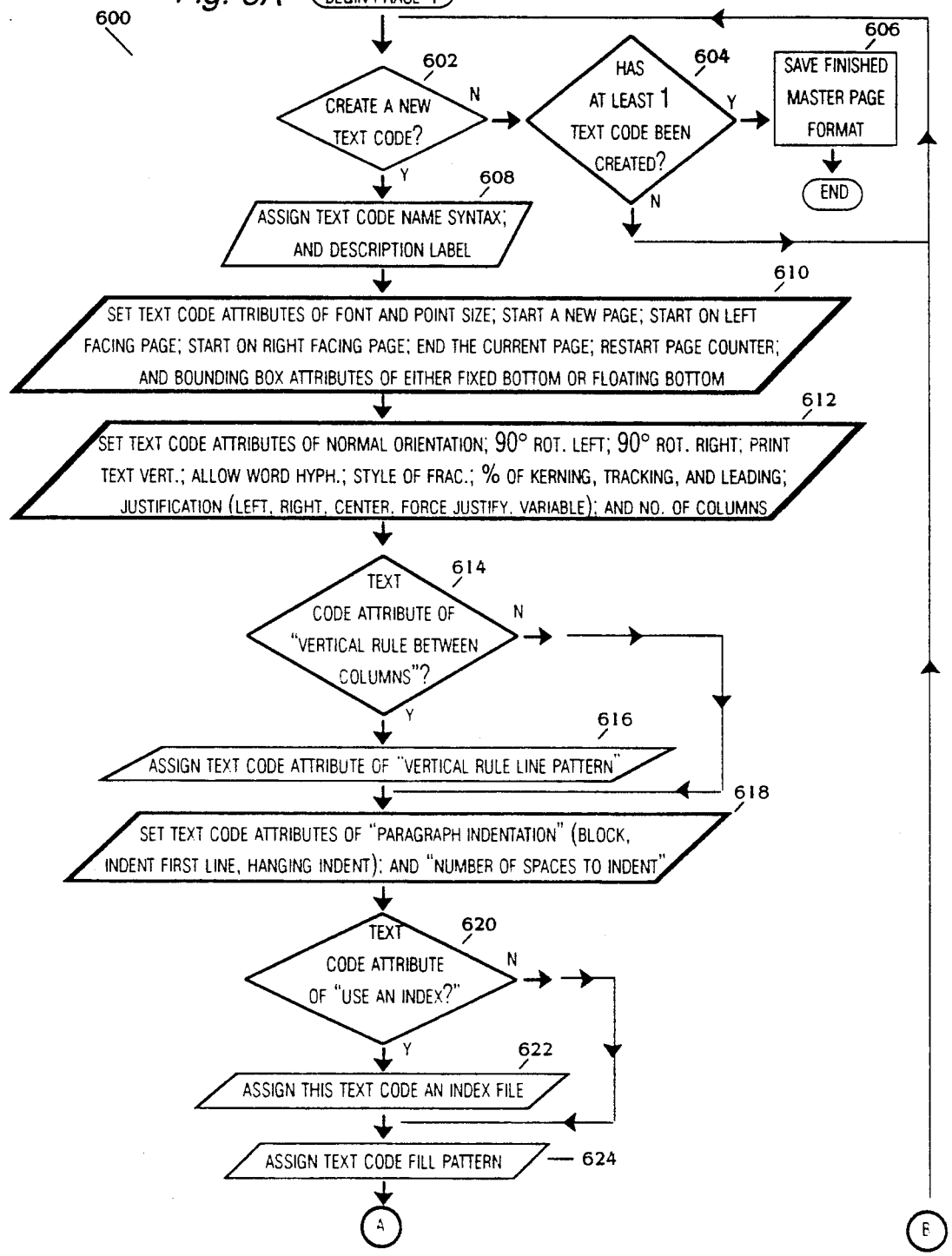

Page Format Utility Program - Phase 4 - "Text"

Code Definition Editor Program

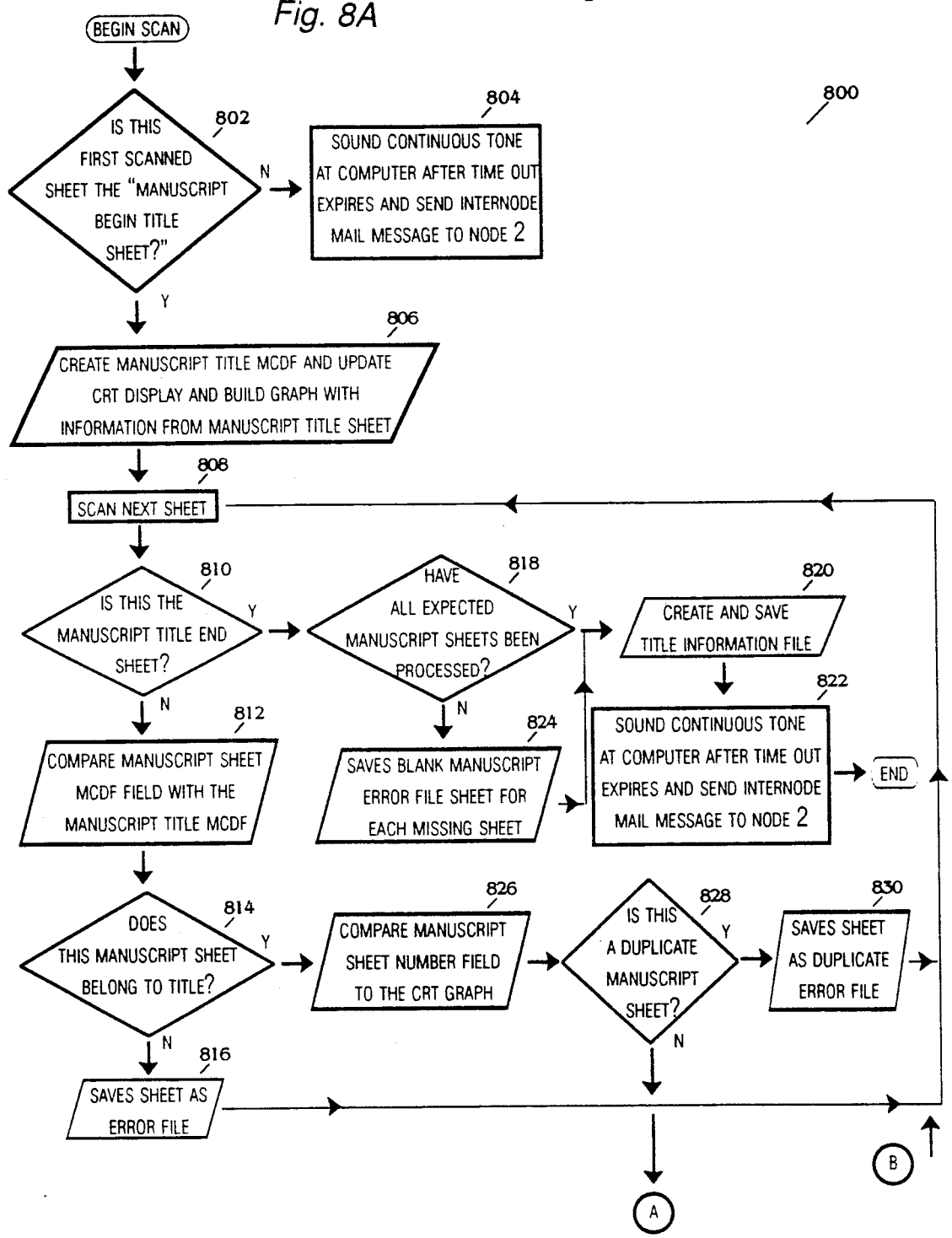
Fig. 8A  Node 1 Program

Node 1 Program

Node 2 Program - General Overview

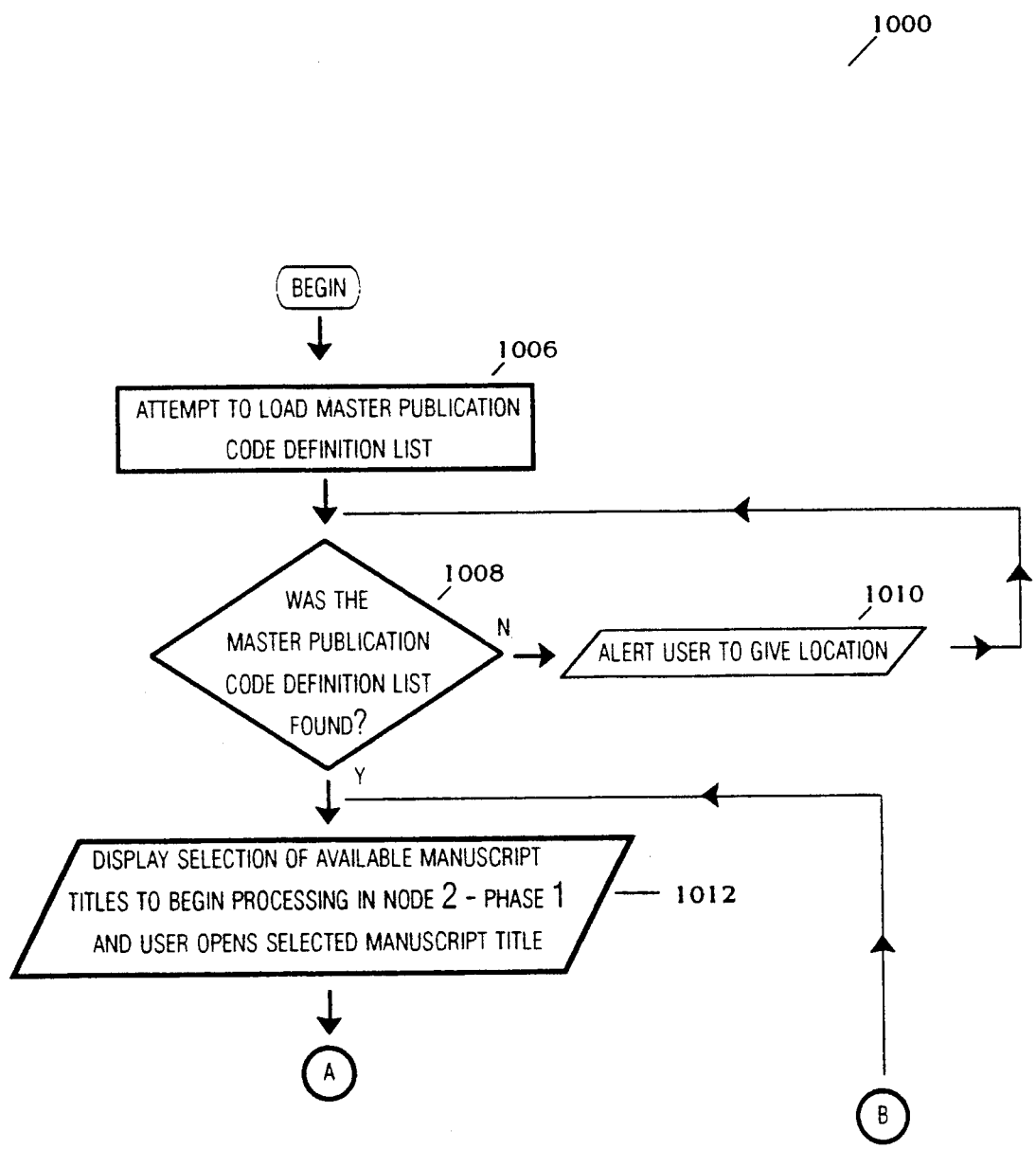
Fig. 10A  Node 2 Program - Phase 1

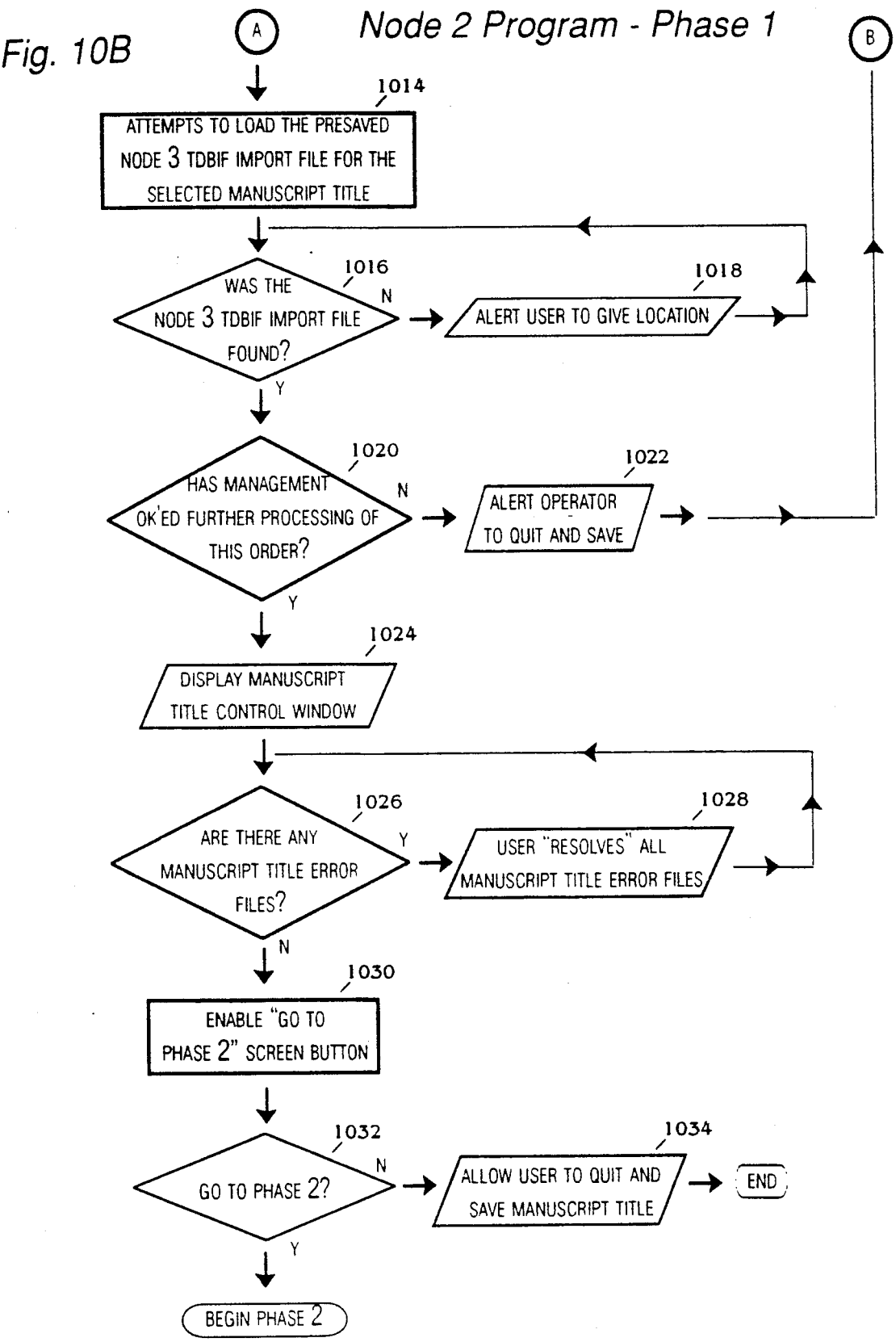

Node 2 Program - Phase 2

Node 2 Program - Phase 2

Node 2 Program - Phase 3

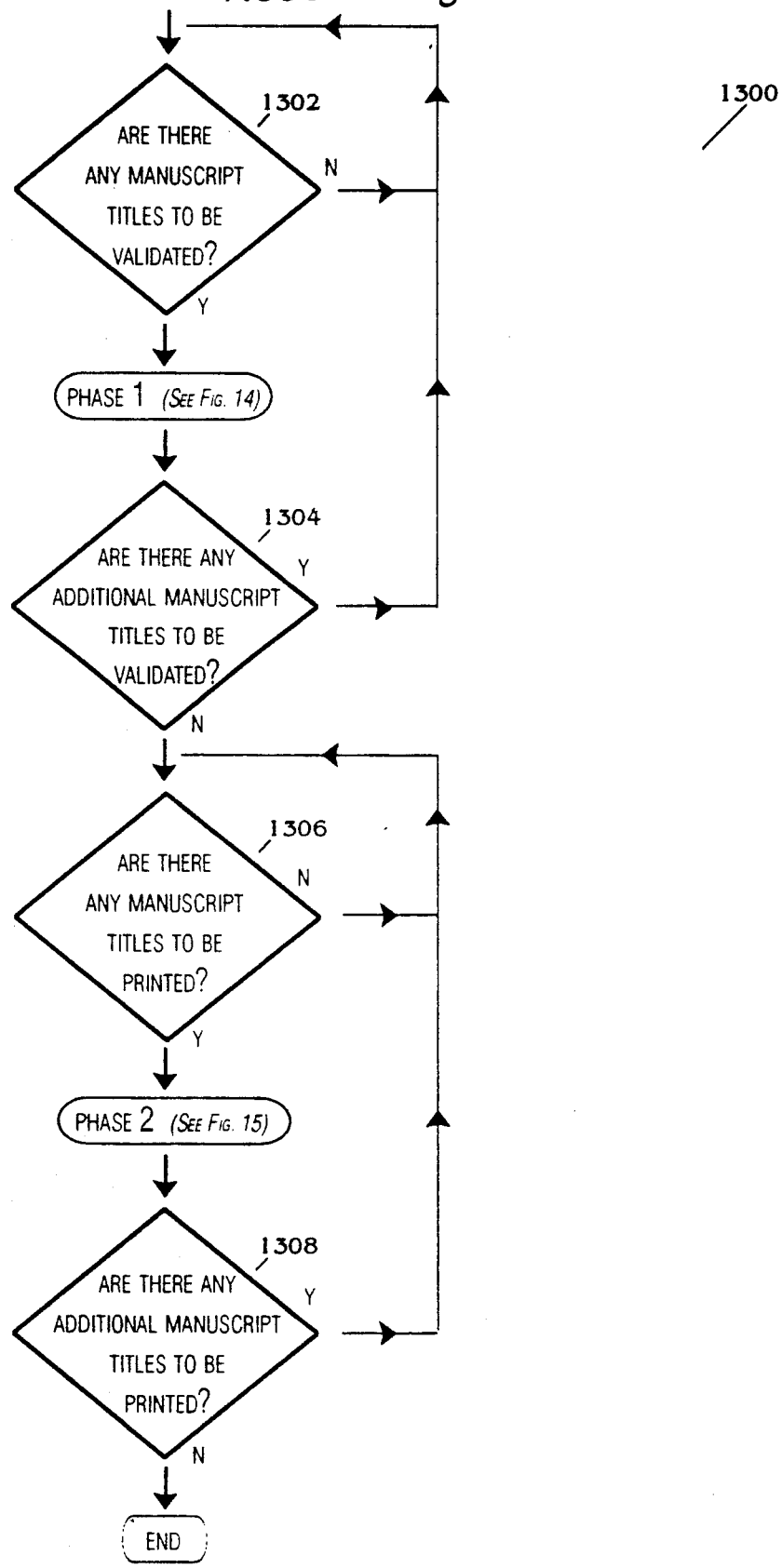
Fig. 13 Node 4 Program - General Overivew

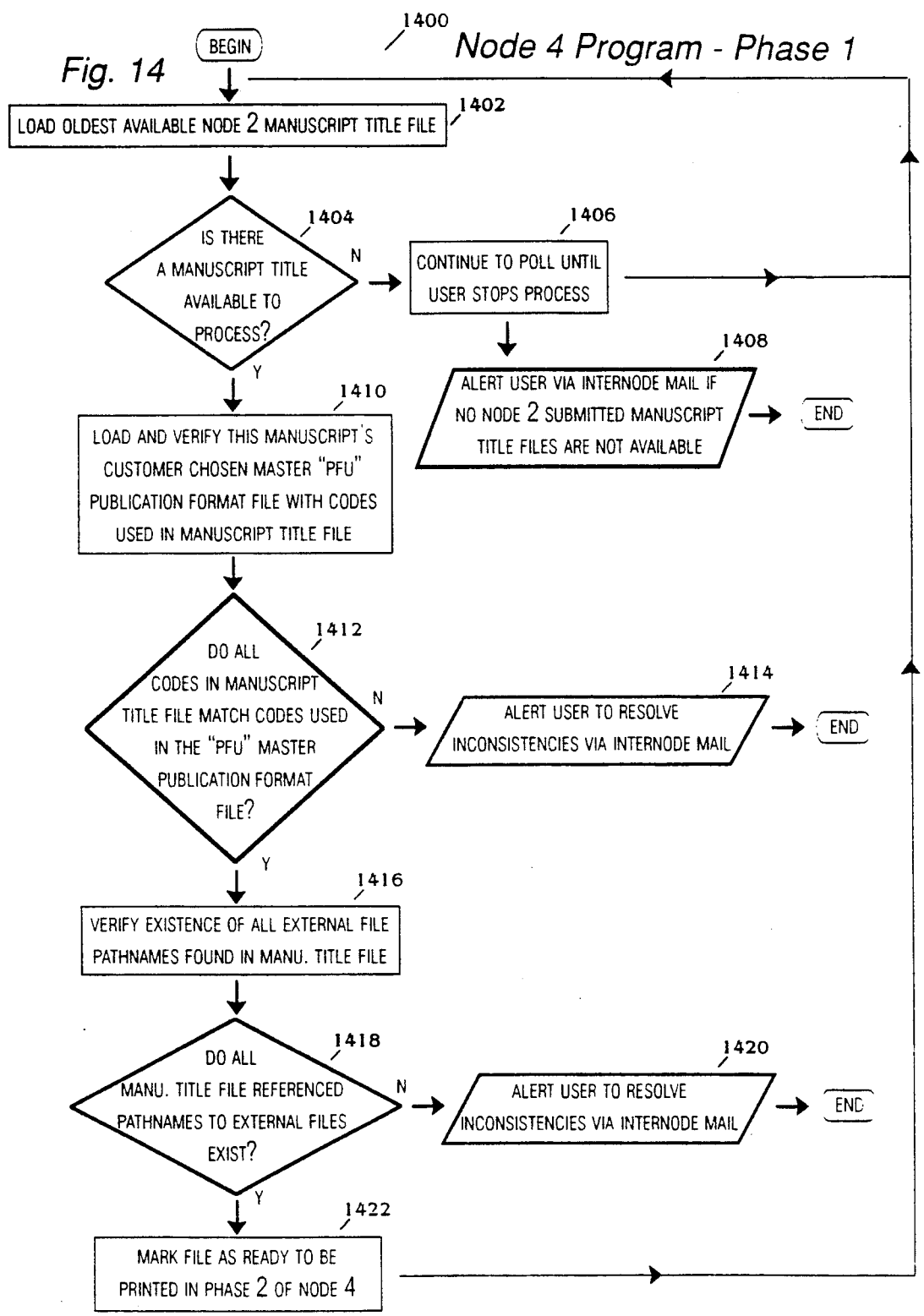

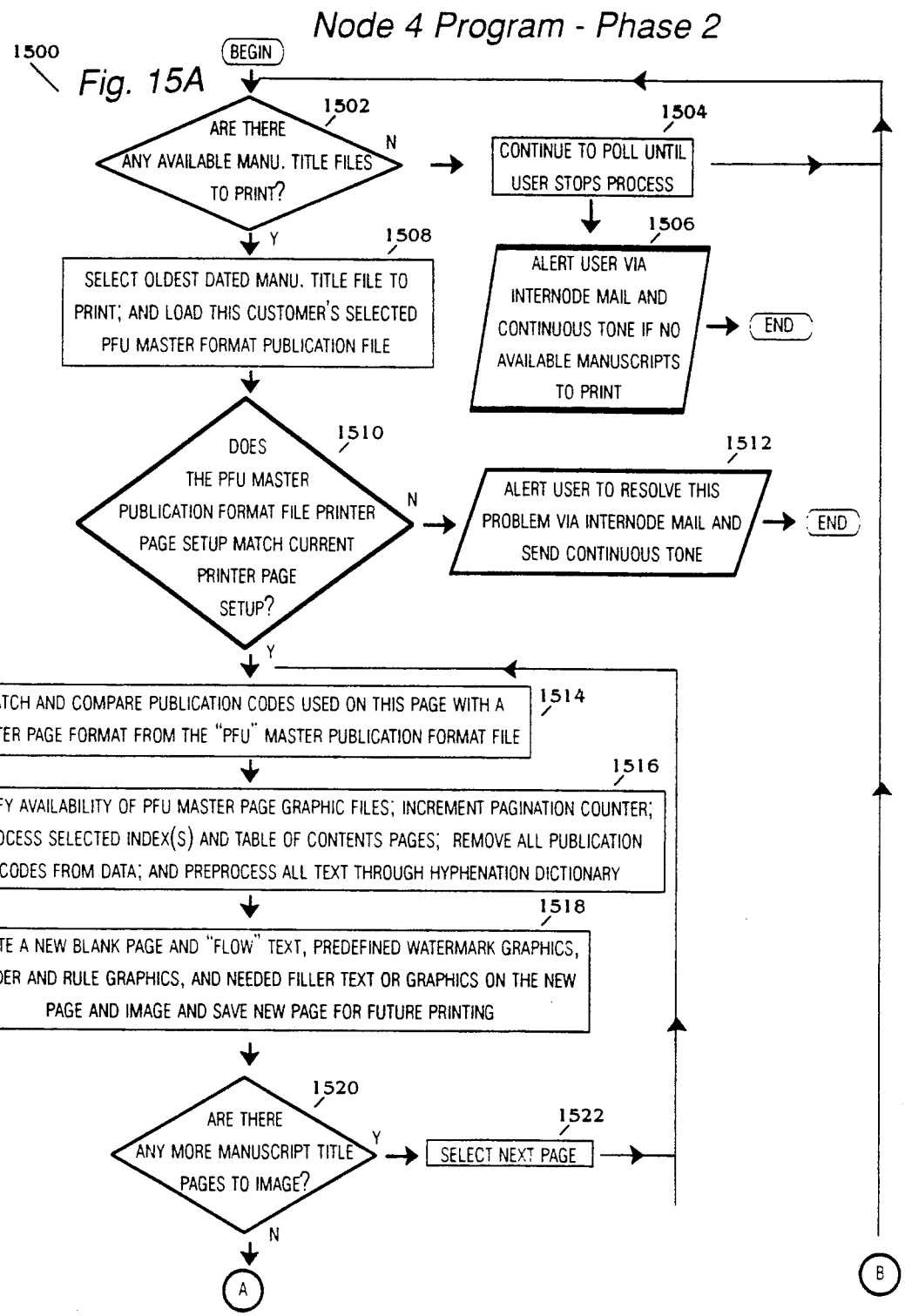

*Node 4 Program - Phase 2*

AUTOMATIC HIGH SPEED PUBLISHING SYSTEM

This application is a continuation of application Ser. No. 07/626,989, filed Dec. 13, 1990, now abandoned.

BACKGROUND OF THE INVENTION

1. Field of the Invention

The present invention relates to printing and publishing. More particularly, it is concerned with a high speed, high production database publishing system preferably having a plurality of microprocessors for flowing manuscript material such as text and graphics into predefined entities making up the structure of a publication according to predetermined attributes associated with each entity, and for imaging manuscript material in a sequence of processing stages with each stage including a plurality of processing operations.

2. Description of the Prior Art

Traditionally, printers and publishers responsible for high volumes of original type set work have many highly qualified data entry personnel, each operating behind an expensive work station for entering original manuscript data into a mainframe computer typography system. At the time of entry, the original manuscript data is also normally preceded and/or succeeded with certain typesetting codes that "tag" the associated text for handling in a special way.

In the prior art, a number of typography control language systems have evolved such as SGML, CALS, TEX and troff which require numerous data entry personnel knowledgeable of the individual typography language codes for modifying and encoding different portions of the text until ready for printing or photo-typesetting. Additionally, specialized personnel must be further proficient in initially setting up and maintaining the so-called rule table or "document type definition" (DTD) for all the different tagging codes used in each typography language.

In another prior art technique, typists or personal computer operators directly compose camera-ready copy from which printing plates can be produced. This process is also expensive and slow because each page must also be totally composed one at a time including page position, margins, fonts, emphasis such as bold and italic, and a myriad of other details, and all without errors.

As is appreciated by those skilled in the art, these prior art systems result in high labor costs and high production costs because of the relatively slow throughput. Accordingly, the prior art points out the need for a system which eliminates the need for large numbers of highly skilled data entry personnel, and which increases production.

SUMMARY OF THE INVENTION

The automatic high speed publishing system of the present invention solves the prior art problems discussed above. More particularly, the system hereof allows data entry personnel with little training to enter manuscript material quickly and efficiently in a "database" manner with minimal encoding, and later allows rapid processing of the manuscript material into camera ready form for many publications with only one operator in attendance.

Broadly speaking, the present invention defines the structure of a publication in advance as being composed of structural entities such as chapter title, author, textual paragraph, index and so forth. Each entity is preassigned selected attributes which include, for example, the position of an entity on a page, font, type size, and which further include such things as whether the page should have thumb index, a graphic icon, border art and so forth. Manuscript material such as dedicated graphics and filler text or graphics useable for many publications can also be stored before entry of any manuscript material particular to a given publication. In operation, the entered manuscript material is retrieved and "flowed" into the corresponding entity in a "database" manner along with other material such as filler text or graphics retrieved in response to the attributes assigned to that entity. As a further advantageous feature, multiple color separations can be automatically created for the same publication.

Additionally, the processing operations are organized into a series of stages for processing the manuscript material in assembly line fashion. This allows a number of publications to be in various stages of process at any one time resulting in automatic high speed processing of manuscript material for publication. Other preferred aspects of the present invention are discussed further hereinbelow.

BRIEF DESCRIPTION OF THE DRAWINGS

FIG. 1 is a schematic illustration of the preferred computer apparatus of the present invention;

FIG. 2 is a computer program flowchart illustrating operation of Node 3;

FIG. 5B is another portion of the computer program flowchart of FIG. 5A;

FIG. 6A is the first portion of a computer program flowchart illustrating phase 4 operation of the Page Format Utility computer of FIG. 1.

FIG. 8A is the first portion of a computer program flowchart illustrating the operation of Node 1 of the computer apparatus of FIG. 1;

FIG. 10A is the first portion of a computer program flowchart illustrating Phase 1 operation of Node 2;

FIG. 10B is the remaining portion of the computer program flowchart of FIG. 10A.

FIG. 13 is a computer program flowchart illustrating a general overview of the operation of Node 4;

FIG. 14 is a computer program flowchart illustrating phase 1 operation of Node 4;

FIG. 15A is the first portion of a computer program flowchart illustrating phase 2 operation of Node 4.

DETAILED DESCRIPTION OF THE PREFERRED EMBODIMENT

Figure 3A:
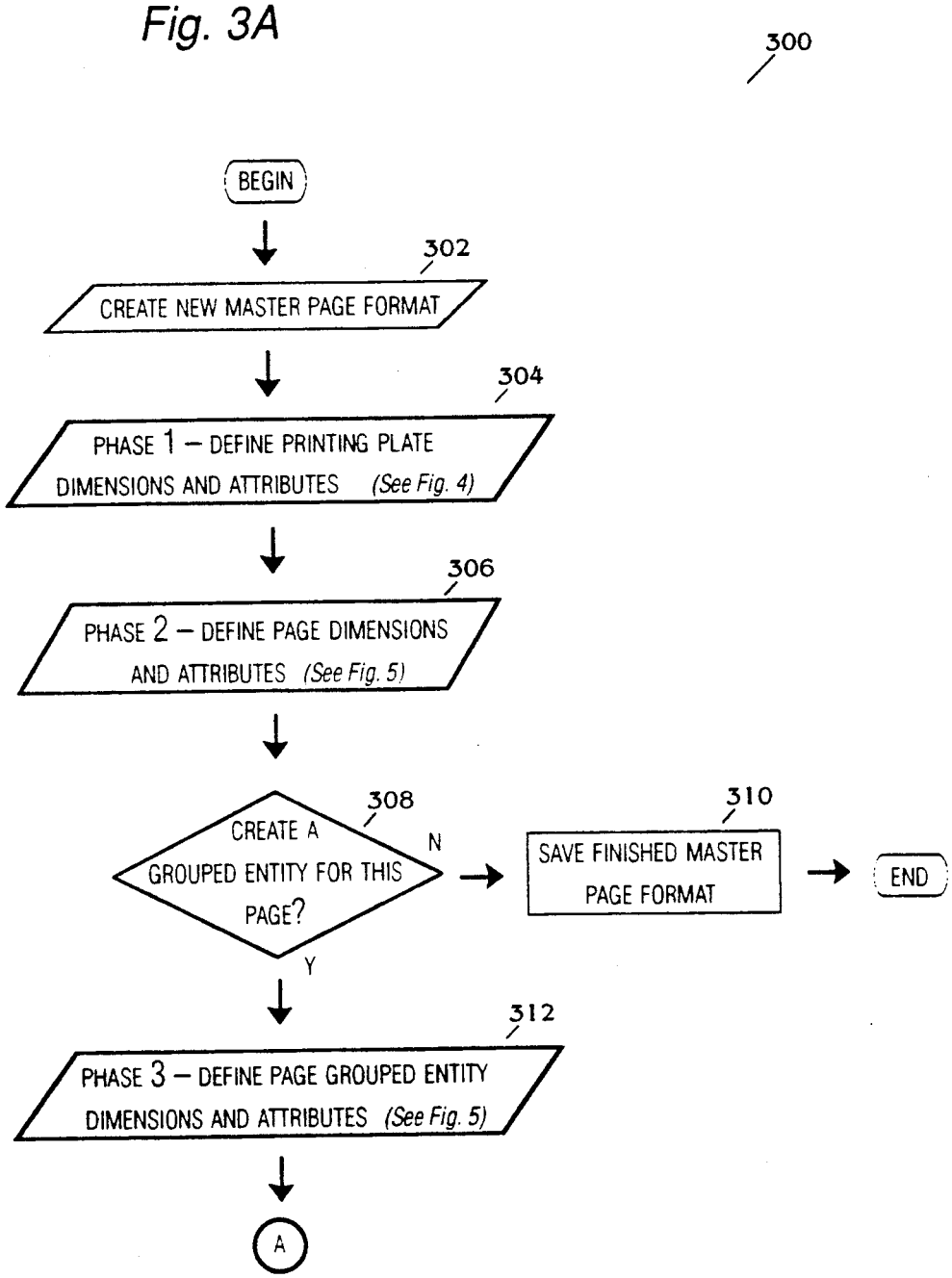
FIG. 3A is the first portion of a computer program flowchart illustrating a general overview of the Page Format Utility computer of FIG. 1.
Figure 3B:
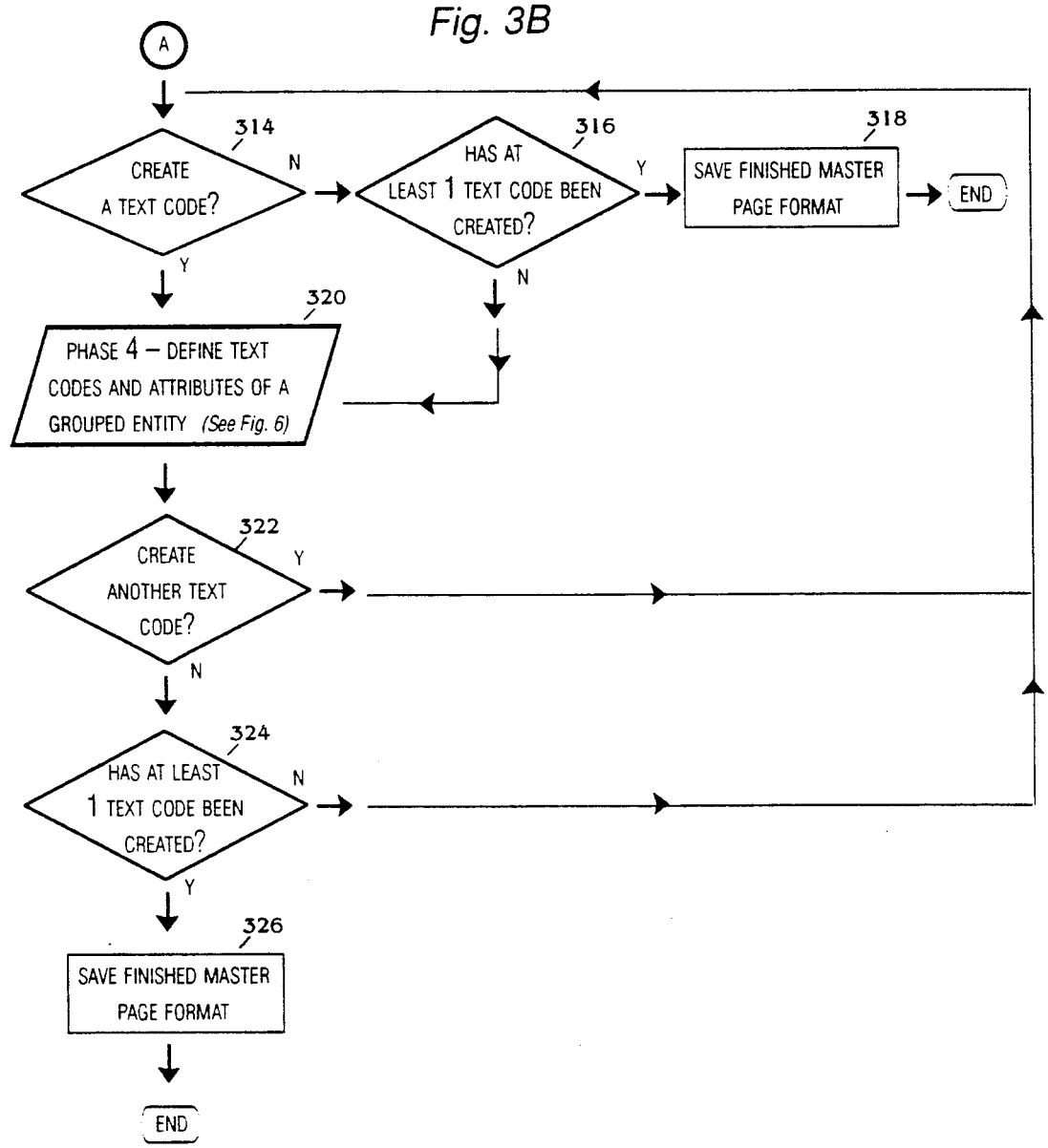
FIG. 3B is the remaining portion of a computer program flowchart of FIG. 3A.
Figure 4:
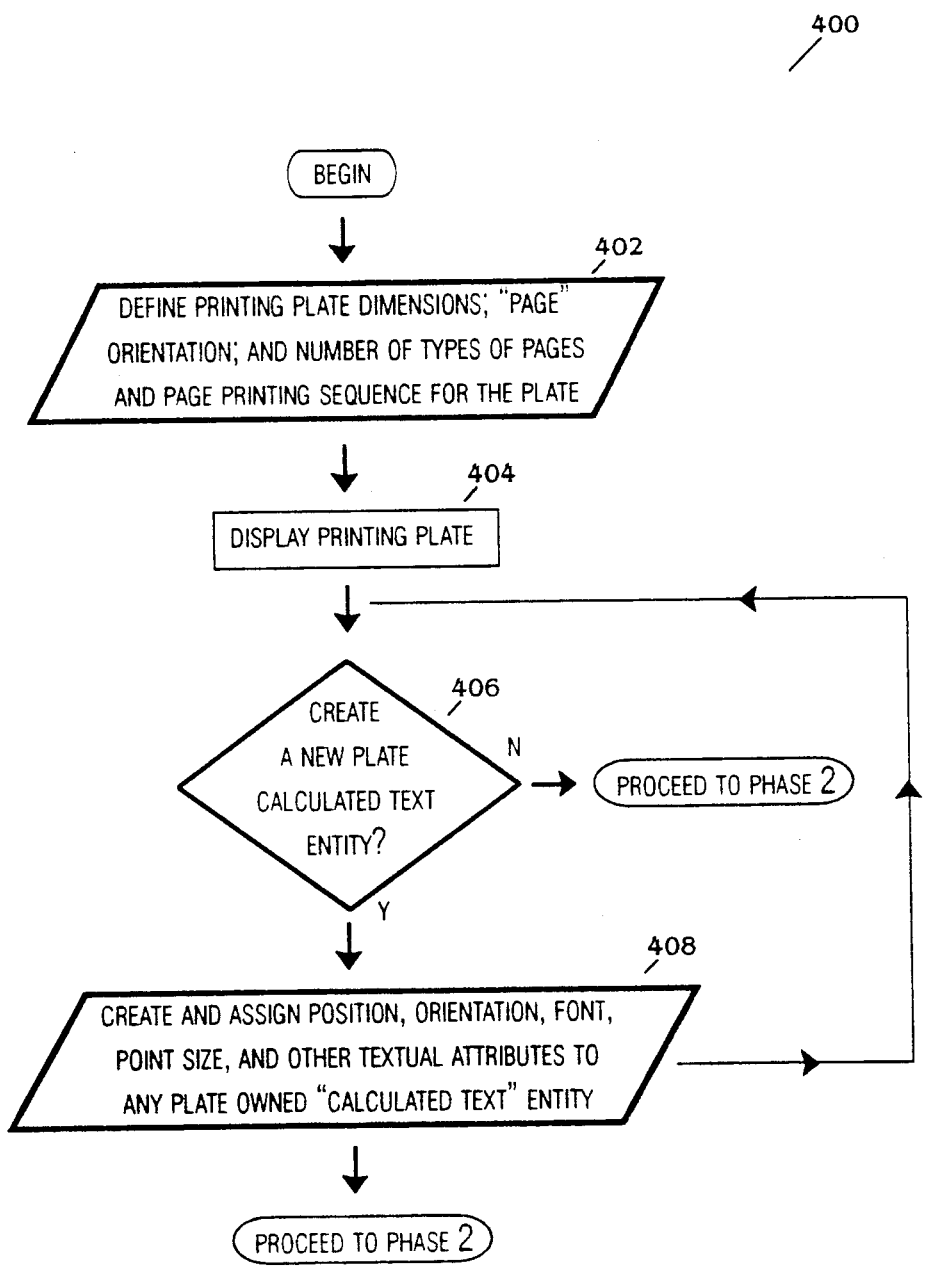
FIG. 4 is a computer program flowchart illustrating phase 1 operation of the Page Format Utility computer of FIG. 1.
Figure 5A:
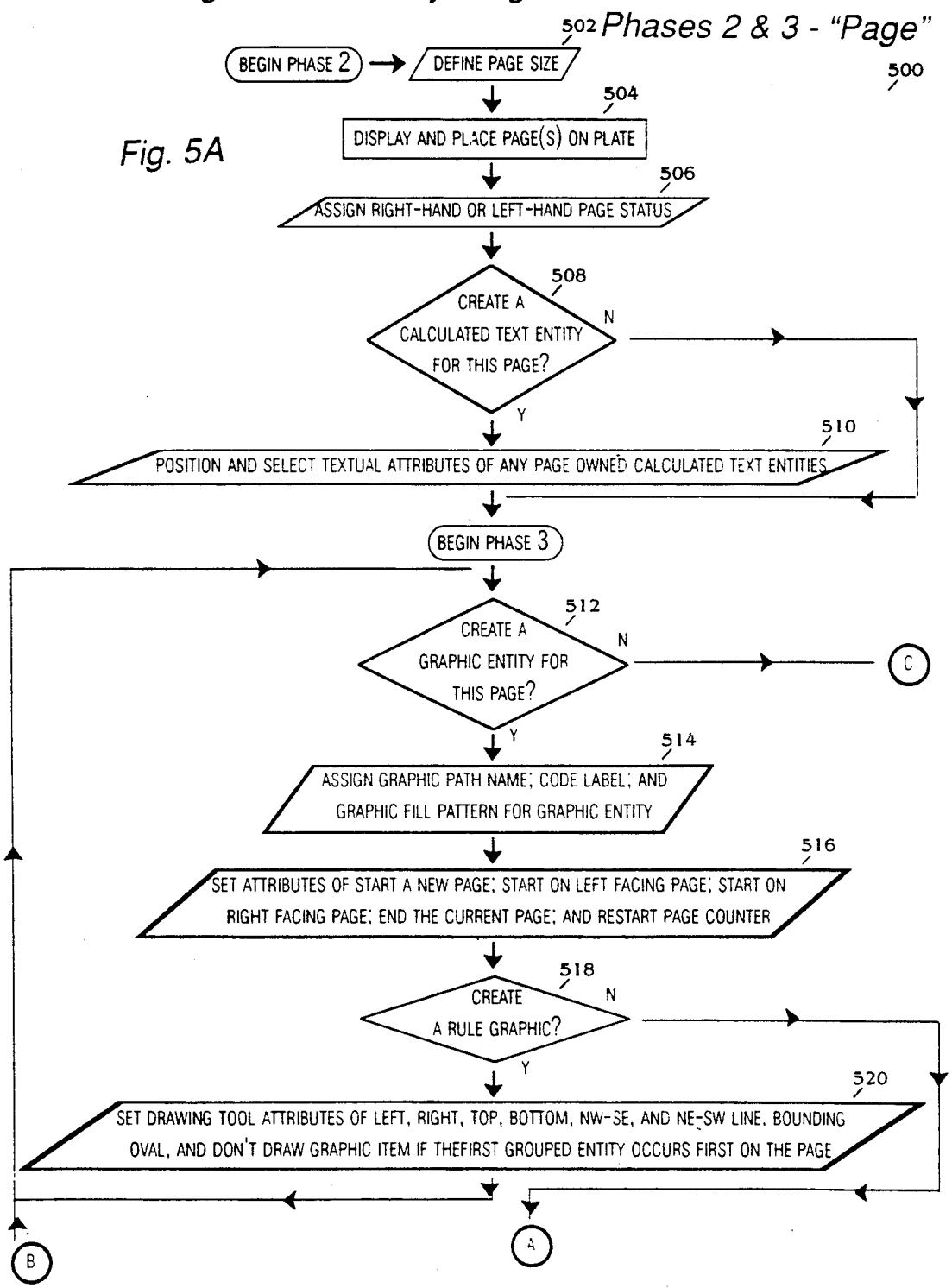
FIG. 5A is the first portion of a computer program flowchart illustrating phase 2 and 3 of the Page Format Utility computer of FIG. 1.
Figure 5C:
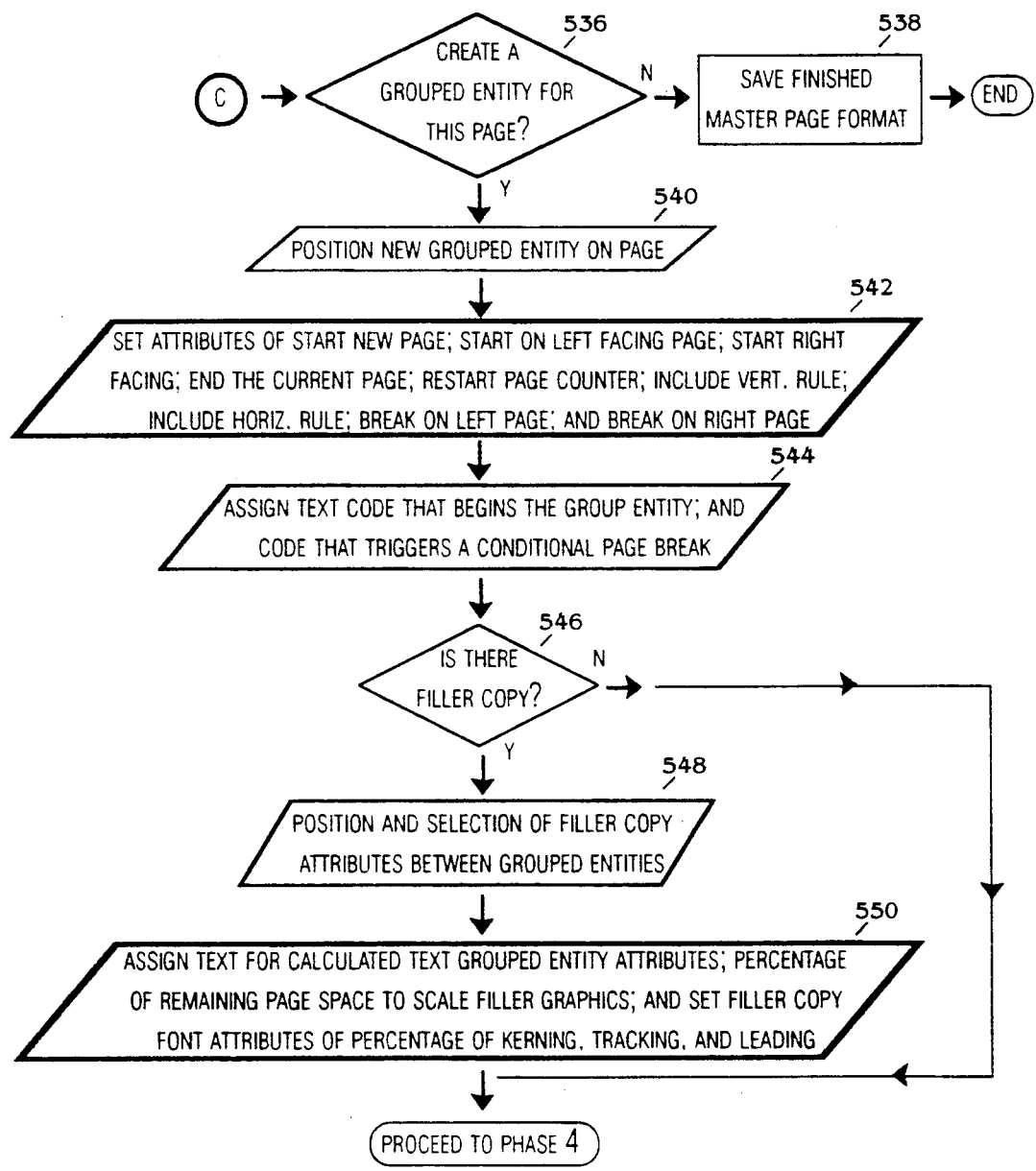
FIG. 5C is the remaining portion of the computer program flowchart of FIG. 5A.

FIG. 1 illustrates the preferred embodiment of the high speed, high production publishing apparatus 10 in accordance with the present invention. Apparatus 10 broadly includes Node 3 computer system 12, Node 1 computer 14, Node 5 computer 16, Node 2 computer 18, Code Definition Editor computer 20, Node 4 computer 22, Page Format Utility computer 24 and system output printer 26, all conventionally interfaced for data transfer therebetween as represented by the dashed arrows. Computers 14-24 are preferably microcomputers and, in particular, Macintosh II computers. Computers 18, 20 and 24 also include conventional keyboards and monitors allowing the system operator to monitor the system and enter data.

Computer system 12 associated with Node 3 includes a plurality of personal computers interfaced with one another and making up a conventional business network for entry of customer orders, tracking of deliveries and so forth. Node 5 computer 16 functions conventionally as a file server for data storage and transfer among the computers. Computer 14 comprising Node 1 receives manuscript material from an optical scanner, floppy disk or the like. Printer 26 is preferably a POSTSCRIPT compatible printer or photo-typesetter operable for producing camera-ready printed matter in signature format, or for printing a copy of the finished publication.

In operation, manuscript material making up a publication is processed in assembly line fashion starting at Node 1 where original manuscript material is entered, and then proceeds through Node 4 by way of the Node 5 file server and then to printer 26 where the publication is printed typically as camera-ready copy. Additionally, Nodes 1, 5, and 4 interact with Nodes 2 and 3 and with computers 20 and 24 in order to perform predefined processing steps. With this configuration, a publication is produced in stages with each stage performing a number of processing operations, and each stage can be performing operations concerned with a different publication at the same time. As a result, a delay concerning a particular publication at any one stage does not affect the handling of other publications at other stages. Because of this, production is much more efficient and proceeds at a much higher speed.

FIGS. 2-15B are computer program flowcharts illustrating the programs for operating apparatus 10, and in particular for operating Nodes 1-4 plus the Code Definition Editor and the Page Format Utility programs. By way of overview, a customer wishing to have a publication developed such as a cookbook consults with the publisher to determine the format and look of the desired publication. As those skilled in the art will appreciate, preparation of a cookbook presents one of the most complicated publications and the present invention is discussed in this context to fully illustrate its power and utility. The present invention is useful, however, for preparing many types of publications including such things as novels, textbooks, catalogues, annual reports, prospectuses, directories and so forth.

During the consultation process, the customer defines the structure of the publication in terms of entities. These entities would include such things as table of contents, index, chapters, acknowledgement and patron pages, and the substantive content of the recipe pages of the book. For example, the bulk of the cookbook is composed of recipes which includes the textual entities of title, author, ingredient list, recipe method, and possibly filler text. Other entities and other types of pages may also be predefined. The recipe pages may also contain graphical entities such as border art, rules, icon art, watermark graphics, filler graphics, and so forth. The cookbook can also contain other additional pages such as additional pages for the cookbook user to enter handwritten recipes and notes, and useful information pages such as measurements, recipe ingredient substitutions, holiday meal suggestions, history or photo pages, and so forth.

After deciding the basic structure of the publication, the attributes of each entity need to be defined such as page position and format, inclusion of graphics and filler text, type font, point size, icon art and a vast array of other optional attributes.

Upon receipt of the customer requirements and specifications, the operator of apparatus 10, then enters the customer attributes into the program of Page Format Utility (PFU) computer 24. Additionally, the operator enters numerous other attributes required for imaging the publication but not of particular interest to the customer. These additional attributes might include such things as printing plate dimensions, layout, and so forth. The program in computer 24 then develops the internal codes identifying the entities and associated attributes in a "database" fashion.

Next, the system operator, by way of Code Definition Editor computer 20, further defines each entity's code to be used by the typists for entering original manuscript material as originally created in the matching PFU program above. In the example of the cookbook, recipes may be received in many formats, handwritten and typed, from many contributors to the cookbook. The typists enter the recipes by identifying the text with the appropriate entity code. For example, the title of the recipe would have a title code, the ingredient list would have an ingredient code and so forth. Because the number of entities which the typist must deal are limited, the typist need only deal with a very few entity codes, and need not be concerned with the many other entity codes and attribute codes handled internally with the system or how the data will eventually look on the finished printed page.

Because the format and arrangement of each entity is determined by the associated attributes in the PFU, the typist need not be concerned with these either. Instead, the typist can enter all the manuscript material as conventionally left justified and without having to be concerned with page placement, spacing, font, point size and so forth. In other words, the typist need only type and does not have to be skilled in composition and need not be familiar with the vast array of codes associated with the many different publishing systems. The typist need only enter the preferred short code identifying each entity and the associated text entity. Additionally, the typist can use an extensive list of certain abbreviations which are automatically expanded during the processing of the manuscript material. Furthermore, the preferred embodiment predefines a certain list of "correction codes" which allow the typist or proofreader to enter corrections at the end of a manuscript without the need for retyping the material that is in error in its proper location. The original manuscript material is entered in Node 1 which ensures that all the pages have been received.

Node 2 then performs a number of operations on the data including error checking and correction for codes and spelling, counts the number of billable items such as the number of recipes, an saves the file for later processing. This means that the operations of Nodes 1 and 2 operate as separate stages in the operation of apparatus 10. In this way, the operator can be dealing with error resolution at Node 2 on one publication, while original manuscript for a different publication is being entered at Node 1.

Similarly, Node 4 independently acts on a different manuscript as well. When a publication is ready to be imaged, Node 4 retrieves the entity and attribute codes concerned with the publication and then "flows" the manuscript material into each predefined entity. The manuscript material may also include text and/or graphics not entered by way of Node 1. But rather, other manuscript material may be prestored in memory and automatically retrieved for inclusion in a particular entity on the basis of the attribute codes assigned thereto. For example, an attribute may call for filler text and graphics to be associated with a particular entity. Node 4 retrieves this material and images it as appropriate. Again, the operations of Node 4 are also independent of the operations of Nodes 1 and 2. Thus, Node 4 can be in the process of imaging a particular publication while Nodes 1 and 2 are processing material from different publications respectively. After imaging, the publication can be printed by way of printer 26 in the form of camera-ready copy for preparation of printing plates.

NODE 3 PROGRAM (FIG. 2)

Node 3 program 200 is a custom printer's or publisher's business and production database application. In preferred practice, a new data base record will be created for each publication, that is, manuscript title, well before original manuscript material is created. The present invention easily allows the customer in consultation with the publisher to specify all selectable aspects of the finished publication form before the publication itself is created and before any original manuscript material is entered.

As explained further hereinbelow in connection with the other programs of the system, the customer is presented with a vast array of options for the publication which allows the publication to be custom-tailored to the customer's requirements and tastes. For example, the customer can select the number of pages, page size, font, type size, graphics, filler text, chapter sequence, table of contents, publication index, thumb index, illustrative icons and so forth. Because of this vast array of choices, each publication may indeed be a unique creation.

On the basis of the customer's decisions, Node 3 program 200 creates the TDBIF (Title Data Base Information File) Import file for the customer's publication. Node 3 program 200 enters at step 202 which creates a blank TDBIF import computer file. Step 204 then imports the job order number from the data base, job order city and state, "process title" data flag, the "customer chosen Master Publication Format File name", the name of the manuscript title, imports the index selections (which may include, for example, a standard index or multiple indices at the end of the publication), and finally, the customer's organization name. Next, step 206 imports a list of the chapter names in the publication, and a list of the customer's agreed upon billable items.

The program then moves to step 208 which imports the computer path name to the publisher filler billable items for each manuscript chapter, the computer path name to the filler text copy for each chapter in the manuscript for importation from the resident database, and the computer path name to the filler graphics for each manuscript chapter. In the preferred embodiment, many items of filler text and graphics are stored for use on many publications and can be specified by the customer for insertion in the publication wherever desired. For example, if the customer is requesting a cookbook, standard filler text can be retrieved as appropriate to each chapter such as main courses, desserts, beverages and so forth. In this way, each chapter or page can begin or end with a short textual narrative concerning the types of recipes contained in the chapter. Additionally, filler graphics can also be specified as appropriate for each chapter in the same manner.

Step 208 also imports the actual filler graphics path name for each chapter as specified by the customer, imports the computer path name to the selected dedicated graphics for each chapter, and imports the computer path name to the Icon Art if selected for each chapter. As an example of Icon Art, the customer may specify an icon representing a piece of pie to be associated with each pie recipe or may wish this icon associated with the thumb index tab on those pages containing pie recipes. Finally, step 208 imports the computer path name to any customer selected watermark graphic for each chapter.

Program 200 then moves to step 210 which imports the chapter Customer Filler graphics flag, imports any special computer room processing instructions for this customer's order, and imports the customer billable item count for each chapter. In addition, step 210 imports the alphabetical sorting instruction flag, the title of the thumb index for the manuscript title, and the thumb index tab phrases for each chapter. Finally, step 210 imports the Calculated Text Entities to be used throughout the manuscript. The Calculated Text Entities are text entities that may vary and include, for example, chapter title, organization name, publication title, and conditional or additional text to appear on a page under predefined circumstances.

Next, step 212 imports the finished manuscript page arrangement list, and imports from the permanent data base the phrases search and replace list. Finally, step 214 saves the finished TDBIF Import computer file for later use by Nodes 2 and 4 during processing of the manuscript titles.

PAGE FORMAT UTILITY (PFU) PROGRAM GENERAL OVERVIEW (FIGS. 3A-B)

The PFU program creates and saves a unique set of display and printing instructions concerning how the text and graphics associated with a specific, predetermined set of codes will appear on the finished page. This defines the "Master Page Format" for the printed page. A set of these formats for all of the pages to be imaged in a particular type of publication makes up the "Master Publication Format." As can be appreciated, the codes used in the PFU program need to be coordinated with the same codes used in the Code Definition Editor discussed further hereinbelow.

The PFU program allows the customer with the assistance of the publisher to predefine the structure of the publication by defining the structural entities making up the publication and selected attributes associated with the entities. As will be appreciated, once the PFU creates a particular Master Publication Format File, this file can be used as many times as desired. In addition, after a plurality of these files have been created, prospective customers can be presented with a selection of already created formats from which to choose. In this way, a new Master Publication Format File need not be created for each new customer. Instead, the new customer would choose from among the wide variety of formats already created for different types of publications, and the corresponding file used for that customer's publication.

The PFU program also allows the appearance of the publication to be predefined by selecting the attributes of each entity. For example, the attributes determine the page position of the entity including margins for each entity, type font, size, kerning, tracking, drop capitals for paragraphs and so forth. By defining the attributes in advance, numerous other efficiency enhancing attributes can also be predefined. For example, each page having recipes can have assigned attributes calling for a thumb index including both text and graphic designs, icons next to each recipe depicting the type of recipe such as a graphic of a piece of pie, border art, and page watermark. Additionally, other attributes can call for the beginning or end of the chapter to include standard filler text used in many different cookbook publications describing the type of recipes found in that chapter. Filler graphics, or dedicated graphics by default, can also be assigned as an attribute to each page which is not filled by a recipe or even imaged in the background of the entire page such as "watermark" graphics. As those skilled in the art will appreciate, numerous other attributes can be assigned to the various entities.

The overview of the PFU program 300 enters at step 302 which allows the customer to create a new Master Page Format. In this step, the structure of the page is defined in terms of entities. The program then moves to step 304 which executes PFU phase 1 (FIG. 4) to define printing plate dimensions and attributes, and then phase 2 (FIGS. 5A-C) which defines page dimensions and attributes in step 306.

Step 308 then asks whether a Grouped Entity is to be created for this page. A Grouped Entity consists of a series of repeated text codes that have a predetermined set of rules among themselves. Such Grouped Entities in a publication could be used for correct display of mathematical symbols, tables of data, components of a recipe, or a directory or catalog item. If the answer in step 308 is no, step 310 saves the finished Master Page Format and the program ends.

If the answer in step 308 is yes, step 312 executes phase 3 (FIGS. 5A-C) which defines the dimensions and attributes of the Grouped Entity of the page. Step 314 (FIG. 3B) asks whether a text code is to be created. If no, step 316 asks whether one text code has already been created. If yes, step 318 saves the finished Master Page Format and the program ends. If the answer in step 316 is no, or if the answer in step 314 is yes, the program moves to step 320 to execute phase 4 (FIGS. 6A-B) which defines the text codes and attributes of the Grouped Entity.

Step 322 then asks whether another text code is to be created. If yes, the program loops back to step 314. If no, step 324 asks whether at least one text code has been created. At least one text code is required for a Grouped Entity and thus, if the answer in step 324 is no, the program loops back to step 314. If the answer in step 324 is yes, step 326 saves the finished Master Page Format and the program ends.

As will be appreciated from the above description, a very advantageous feature of the present invention allows the dual use of the PFU program to create "sister clones" of a Master Publication Format by assigning certain graphic or text entities with the attributes of 100% white or black color. When the same data at Node 4 is "flowed" through the sister Master Publication Format, this data is imaged as a second (or more) color separation in perfect register with other "sister" formats. For example, using one "sister" Master Publication Format, textual material can be first imaged as 100% black and all graphic material imaged as 100% white. Then, using another "sister" Master Publication Format, the graphical material can be imaged as 100% black with the textual material imaged as 100% white. Thus, a second "sister" set of camera-ready copy can then be printed in perfect register with the first for producing printing plates. If multiple color separations are desired, for example, additional camera-ready copy for these additional color separations can be as readily prepared. This saves substantial costs in preparing color separations.

PFU PHASE 1 PROGRAM (FIG. 4)

PFU phase 1 program 400 enters at step 402 in which the operator enters printing plate dimensions, page orientation such as "portrait" or "landscape", the number of different types of pages, and the page printing sequence for the plate. Step 404 then displays an image of the printing plate on the monitor of computer 18 for visual verification.

Step 406 then asks whether identifying data is to be placed in the margins of the printing plate which is data outside the printing field of the plate. Such identifying data is called a "Calculated Text Entity" and could include such things as the publisher order number for the publication or other data to distinguish these printing plates from others. If the answer in step 406 is no, this phase of the program ends and the program moves to phase 2.

If the answer in step 406 is yes, step 408 prompts the operator to enter the identifying data label and to assign the position, orientation, font, point size, and other textual attributes assigned to the Calculated Text Entity. The program then moves to phases 2 and 3.

PFU PHASE 2 AND 3 PROGRAM (FIGS. 5A-C)

Phase 500 enters at step 502 in which the operator is prompted to define the sizes of the individual pages. Step 504 displays on the monitor of Node 2 computer 18, the placement of the page on the printing plate. In step 506 the operator then assigns the right-hand or left-hand status to each page on the printing plate, as displayed.

Step 508 then asks whether the operator wishes to create a Calculated Text Entity for the currently selected page. If yes, the operator positions and selects the textual attributes of a page associated with the Calculated Text Entity. These attributes may include font, point size, leading, and fill pattern that the printed page associated with the text entity will display. For example, the associated Calculated Text Entity may eventually contain the chapter name, publication title, or authors name.

If the answer in step 508 is no or after step 510, the program begins Phase 3 in which step 512 asks whether the operator wishes to create an automatically reoccurring graphic entity for the currently selected page. Advantageously, many graphic entities are contained in resident memory for use on any selected publication. Because of this, it is usually not necessary to originally create graphics. Hence, the prior art requirement for manual creation of graphic entities is eliminated. If step 512 is no, the program bypasses the graphic selection steps and moves directly to the later portion illustrated in FIG. 5C.

If the creation of graphic entities is desired in association with the currently selected page, the program moves to step 514 in which the operator assigns a graphic path name for the selected graphic. In this step the operator also assigns the "graphic code label" for the graphic, and sets the graphic fill pattern. For example, the effect of reverse type can be created by creating a rectangular graphic entity with a 100% fill pattern of black over a text entity code that has been assigned a 100% white fill pattern.

Step 516 prompts the operator to set the attribute "start a new page" to ON or OFF for this graphic entity. Additionally, step 516 prompts the operator to indicate the attributes of "start" on the left or right facing page, end the current page, and restart page counter.

Step 518 asks whether the operator wishes the graphic entity to be a typography "rule" graphic. If yes, step 520 allows the operator to select for the page a horizontal or vertical rule, a left or right diagonal rule, or a bounding oval. This step also allows the operator to indicate use of the rule if the first grouped entity first occurs on the page. The program then loops back to step 512 and the subsequent steps to allow creation of other graphics.

If the answer in step 518 is no, the program moves to step 522 (FIG. 5B) which asks whether the operator wishes to create a "border graphic" on the page. If yes, step 524 allows the operator to set the border graphic attributes of rectangle, rounded rectangle or oval to ON or OFF, and to define the graphic margins between the graphic and the text that is to appear within the border. In step 526 the operator assigns the graphic border style and the corner radius at the page corners. The program then loops back to step 512 to allow selection of another graphic.

If the answer is step 522 is no, the program moves to step 528 which asks whether the operator wishes to use a presaved dedicated graphic file. If yes, the operator in step 530 assigns and places the presaved file. The program then loops back to step 512.

If the answer in step 528 is no, step 532 then asks whether the operator wishes to create an Icon Art area graphic. Various Icon Art objects are prestored in memory and can be retrieved and placed on this page according to the Icon Art Flag attribute assigned to a text entity on the same page. In the case of a cookbook, for example, Icon Art can include graphic images of the various desserts such as pieces of pie or cake, tumblers for drinks, and so forth. In order to enhance the appearance of the publication, the Icon Art can be automatically retrieved and placed on the page where appropriate according to the attribute assigned to the text entity.

If the answer in step 532 is yes, the operator sets the attributes of the Icon Art area in step 534. That is to say, the operator indicates the size and position of the Icon Art. After step 534 or if the answer in step 532 is no, the program loops back to step 512.

When all of the desired graphics have been selected and the associated attributes assigned, or if, the answer in step 512 is no, the program moves to step 536 (FIG. 5C) which asks whether the operator wishes to create a Grouped Entity for the current respective page. If the answer in step 536 is no, step 538 saves the Master Page Format for this page and this portion of the program then ends. The Master Page Format is the sum of all the decisions made in the previous steps concerning this step. If the answer to step 536 is yes, step 540 allows the operator to create a Grouped Entity and to position this Grouped Entity on the page.

In addition to the page itself having separate entities, the structure of the publication may require that certain entities be associated together, that is "grouped", in association with the other page entities. In other words, the entities associated with a page may be selectively grouped. For example, in the case of a cookbook, Grouped Entities may include the recipe title, ingredient list, method steps, author, border graphics, rule graphics and Icon Art. Thus, when this page is to be imaged for subsequent printing, all of the Grouped Entities are retrieved together and imaged according to the respectively assigned attributes. In this way the composition and look of this page and of all pages of the same type, are defined in advance and are automatically performed without manual intervention. Those skilled in the art will appreciate the tremendous time savings and efficiency resulting from this.

In step 542 the operator then sets various attributes ON or OFF for the Grouped Entity. These assigned attributes include start new page, start on, left or right facing page, end current page, restart page counter, add vertical or horizontal rule, break on left page, and break on right page. In step 544 the operator next assigns the text code that begins the Grouped Entity and the code that triggers a conditional page break. If page continuation ("floating bottom") is allowed such as when a recipe is allowed to carry over to the other page, the attribute of conditional page break determines where in the recipe the page break is to occur. This prevents the page break from occurring in the middle of an ingredient list, for example. Thus, a conditional page break defines where in the Grouped Entities a page break may be allowed.

Step 546 asks whether any filler material is to be included in this Grouped Entity. The filler material can include text and/or graphics. Advantageously, this material is stored in resident memory for use in many different publications. Filler material may be used, for example, when the manuscript material associated with the Grouped Entities is not sufficient to fill the page. The appearance of the page is enhanced by this filler material. In the case of text as the filler material, the content is chosen for relevance to the associated chapter in the manuscript material.

If the answer in step 546 is yes, step 548 then prompts the operator to position and select the filler copy attributes between Grouped Entities. These attributes for filler material as text might include font, kerning, tracking, fill pattern, and leading which the operator defines in percentages. If the answer in step 546 is no, the program proceeds to Phase 4.

Figure 6B:
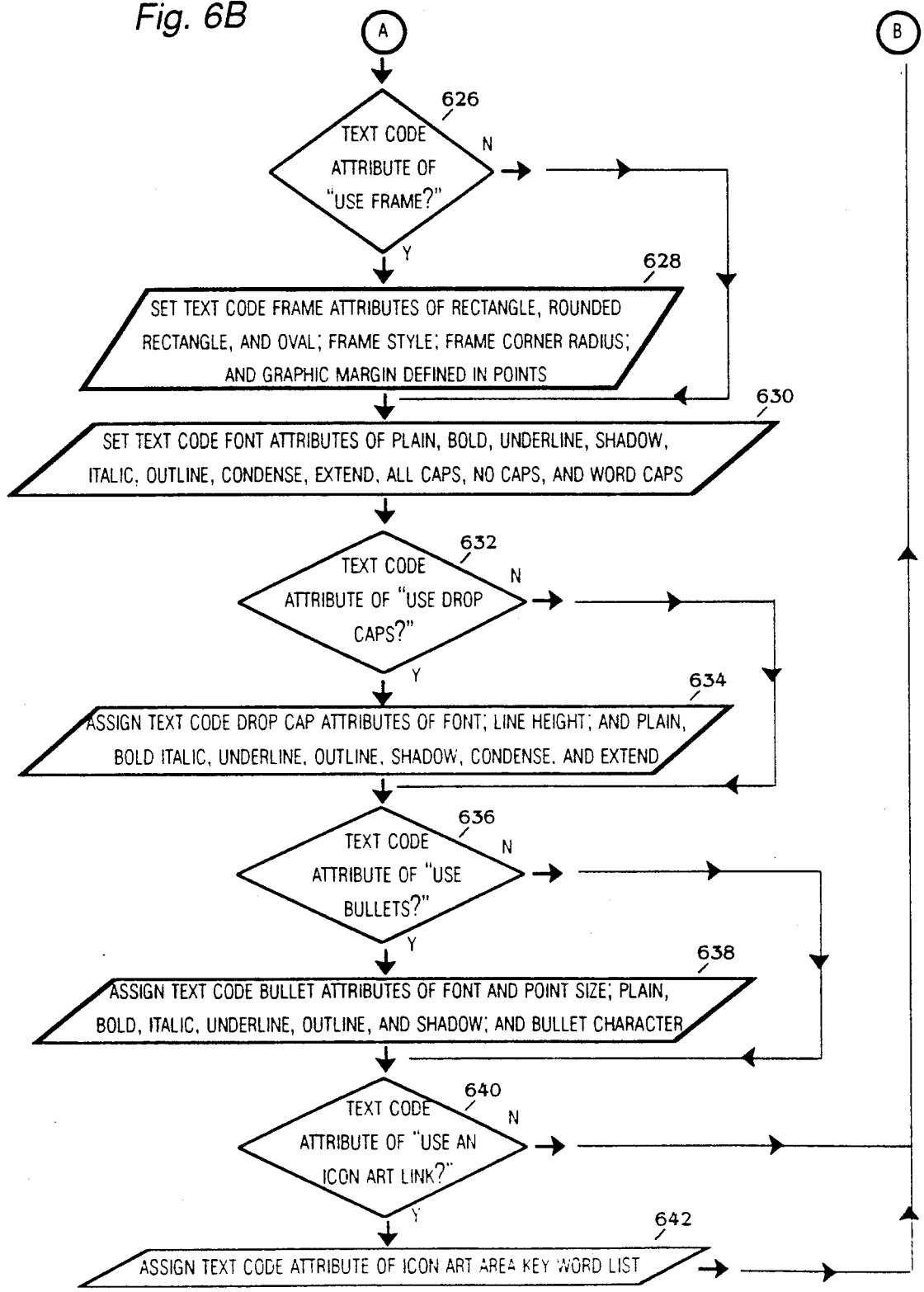
FIG. 6B is the remaining portion of a computer program flowchart of FIG. 6A.
Figure 7:
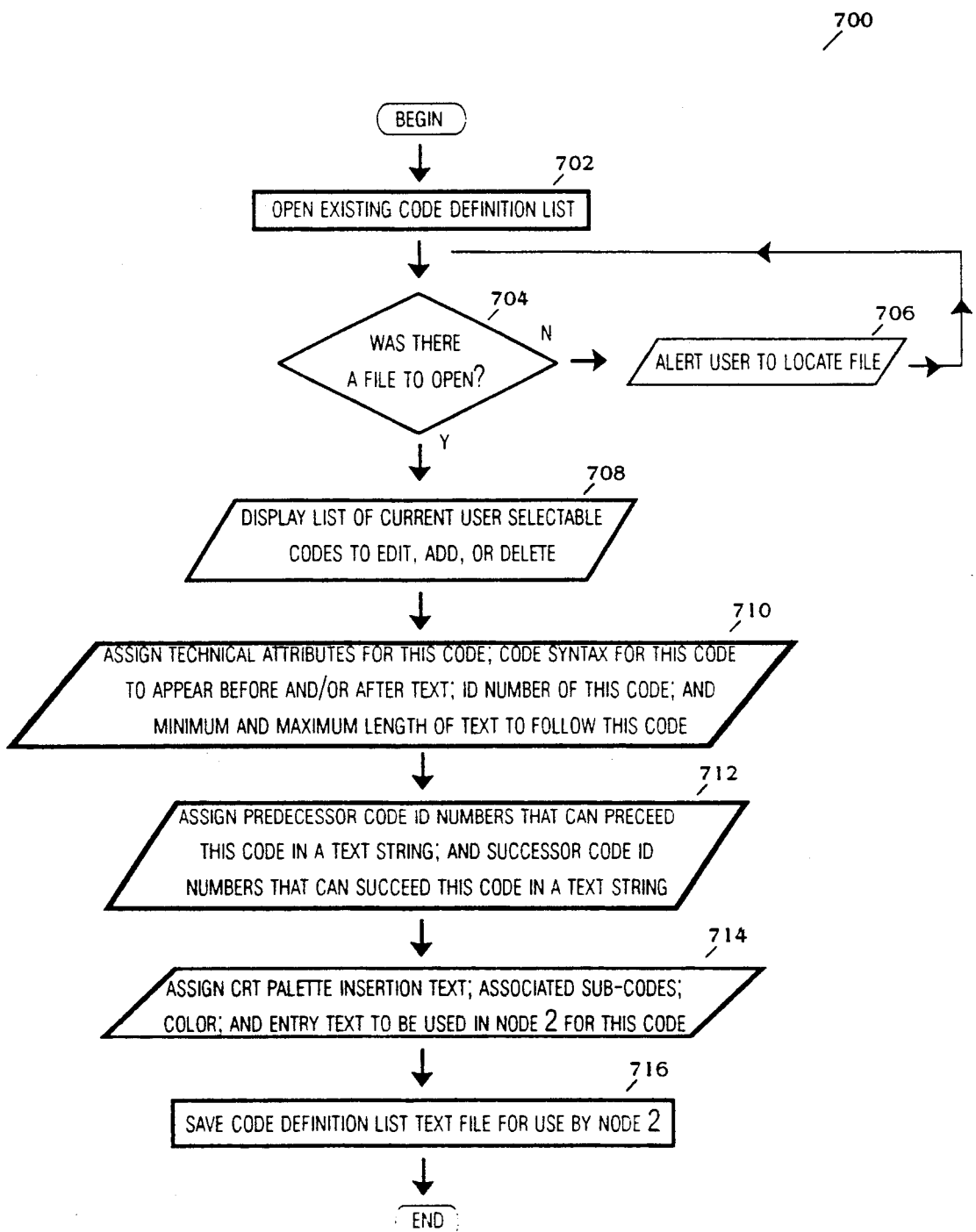
FIG. 7 is a computer program flowchart illustrating operation of the Code Definition Editor computer of FIG. 1.

In step 550 the operator assigns the Calculated Filler Text material as consistent and appropriate for this page. For example, at the end of a chapter in a cookbook, the Calculated Filler Text might be designated as "Write your extra recipes here." In this step, the operator also assigns the percentage of remaining page space to scale the filler graphic. After step 550, or if there is no filler copy as indicated by a no answer in step 546, the program precedes to phase 4 (FIGS. 6A-B).

PFU PHASE 4 PROGRAM (FIGS. 6A-B)

In general, PFU phase 4 program 600 sets the various text attributes associated to the entities associated with the manuscript material to be imaged. Program 600 enters at step 602 which asks whether the operator wishes to create a new text code for this Grouped Entity. If no, step 604 asks whether at least one text code has already been created. If yes, step 606 saves the Master Page Format and this portion of the program then ends. If the answer in step 604 is no, the program loops back to step 602 because at least one text code is required for a Grouped Entity.

If the answer in step 602 is yes, the program moves to step 608 in which the operator assigns the "text code name" syntax to the new text code. Additionally, the operator also assigns the "text code description label" to the new text code. The "text code description label" is a user friendly name of the entity such as "title", "ingredients", "method" and so forth in the case of the example cookbook.

In step 610 the operator assigns the font and point size text code attributes, the text code bounding and box text flow attributes of either "fixed bottom" or "floating bottom", sets ON or OFF for the attributes "start a new page", and "start on left or right facing page." The terms "fixed bottom" means that a recipe cannot be broken and carried to another page and the term "floating bottom" means that such carry over is allowed. In this step the operator also sets ON or OFF for "end of current page" and "restart page counter."

Other attributes are set in step 612 including an ON/OFF indication for normal orientation, 90° rotation left or right, print text vertically, and to allow automatic word hyphenation. The operator also assigns the attributes for style of fractions and the percentages for kerning, tracking and leading. Finally, the operator assigns the text as left, right, center, force, or variable justification as ON or OFF, and assigns the number of columns in which the text would appear.

Next, step 614 asks whether the operator wishes the attribute "vertical rule between columns" to be ON. If yes, step 616 assigns this attribute which in Node 4 will eventually draw a variable length graphic vertical rule depending upon the length of the text flowing through its associated text code preassigned with multiple columns. After step 616 or if the answer in step 614 is no, the operator sets additional attributes in step 618 including paragraph indentation selections such as block, indent first line, and hanging indent, and the number of spaces to indent.

Step 620 then asks whether an index entry is to be created or "tied to" this text entity. If yes, step 622 assigns an index file "type" to this text code so that the appropriate material can be retrieved for later creation of an index. Additionally, the operator also assigns a keyword index file for the current text code. During printing in Node 4, if any key word in the keyword index file is contained in the text associated with this text entity, Node 4 then automatically cross references this code as an additional entry in the index. With this feature an index can be constructed that could have multiple entries for the same text entity. In the case of the cookbook, a recipe for "chocolate cheesecake" could have an index entry under a "keyword" of "chocolate", "cheese", or "cake." After step 622 or if the answer in step 620 is no, the operator assigns the text code attribute "fill pattern" for use in creating reverse type in step 624.

The program then moves to step 626 (FIG. 6B) which asks whether the operator wishes to set the attribute "use frame." If yes, the program moves to step 628 in which the operator assigns the text frame attributes of rectangle, rounded rectangle, or oval and further assigns the frame style, frame corner radius, and defines points in the graphic margin. By these attributes, the selected type of frame border appears around the text associated with this code each time it appears on the finished page.

After step 628 or if the answer in step 626 is no, the operator assigns various text code font attributes including plain, bold, underline, shadow, italic, outline, indents, extend, all capital letters, no capital letters, and word capitals in step 630. Step 632 then asks whether the operator wishes to use drop capitals (drop cap) in which the first letter of a paragraph is capitalized and made lower and then the bottom portion thereof dropped below the text line. If yes, the operator assigns this attribute in step 634 and also assigns the drop cap attributes of font, line height, plain, bold, italic, underline, outline, shadow, condense, or extend.

After step 634 or if the answer in step 632 is no, step 636 asks whether the operator wishes to use the attribute of text "bullets" which are treated as a graphic. If yes, the program moves to step 638 in which the operator assigns the bullet attributes of font and point size, character, and the other attributes as listed.

After step 638 or if the answer in step 636 is no, step 640 asks whether the attribute of "use of Icon Art link" is to be used. This attribute is very advantageous because it allows the program on Node 4 to retrieve a prestored and "named" piece of Icon Art from memory associated with a keyword found in the text entity. In a recipe, for example, this allows the program to search for keywords in a recipe title such as "pie", "cake", "ice cream", and so forth and then to retrieve an associated Icon Art graphic file in response in order to illustrate on the side of the page the main subject matter of the recipe. Depending upon the location attributes associated with the Icon Art, it can be located at the edge of the page for use as a thumb index, for example, which allows a cookbook user to locate quickly recipes of a particular type. If the answer in step 640 is yes, the operator is prompted in step 642 to assign the particular attribute for the use of Icon Art.

After step 642 or if the answer in step 640 is no, the program loops back to step 602 to create additional text codes, if desired. When all text codes have been created this portion of the program ends by way of step 606.

CODE DEFINITION EDITOR PROGRAM (FIG. 7)

The Code Definition Editor program 700 creates a set of unique instructions regarding each publication code to be used by the typist for creating original manuscript material to be entered at Node 1. These same codes are also used and graphically described in the customer-chosen "Master Publication Format" created by the Page Format Utility program (PFU) explained in connection with FIGS. 3A-6B. The code instruction(s) contained in the Code Definition List are tested against the data in the manuscript title at Node 2 and later printed at Node 4 in the style and position according to the customer-chosen Master Publication Format File as processed in PFU program of FIGS. 3A-6B.

Program 700 enters at step 702 which attempts to open an existing Code Definition List. Step 704 then asks whether a list was available to be opened. If no, step 706 alerts the operator to locate the file. The program then loops back to step 704.

If a file was opened in step 704, step 708 displays a list of current operator-selectable codes to edit, add or delete from the loaded code definition list. Step 710 then prompts the user to assign numerous technical attributes for the selected code. Also in this step, the user assigns the code syntax for the selected code which is to appear before and/or after the typist-entered text. The operator then assigns the identification number of the selected code, and the minimum and maximum lengths of text associated with each typist-entered code.

In step 712, the operator assigns the code identification numbers of other codes that can succeed and/or precede the selected code in a text string. Step 714 then assigns the CRT palette insertion text needed at the CRT monitor of Node 2 and the associated legal subcodes for this code. This step also assigns the color and the CRT palette "entry text" i.e., the user friendly name of the typist code, to be used in Node 2 for the selected typist-entered code. Finally, step 716 saves the code definition list text file for use by Node 2.

NODE 1 PROGRAM (FIGS. 8A AND 8B)

Figure 8B:
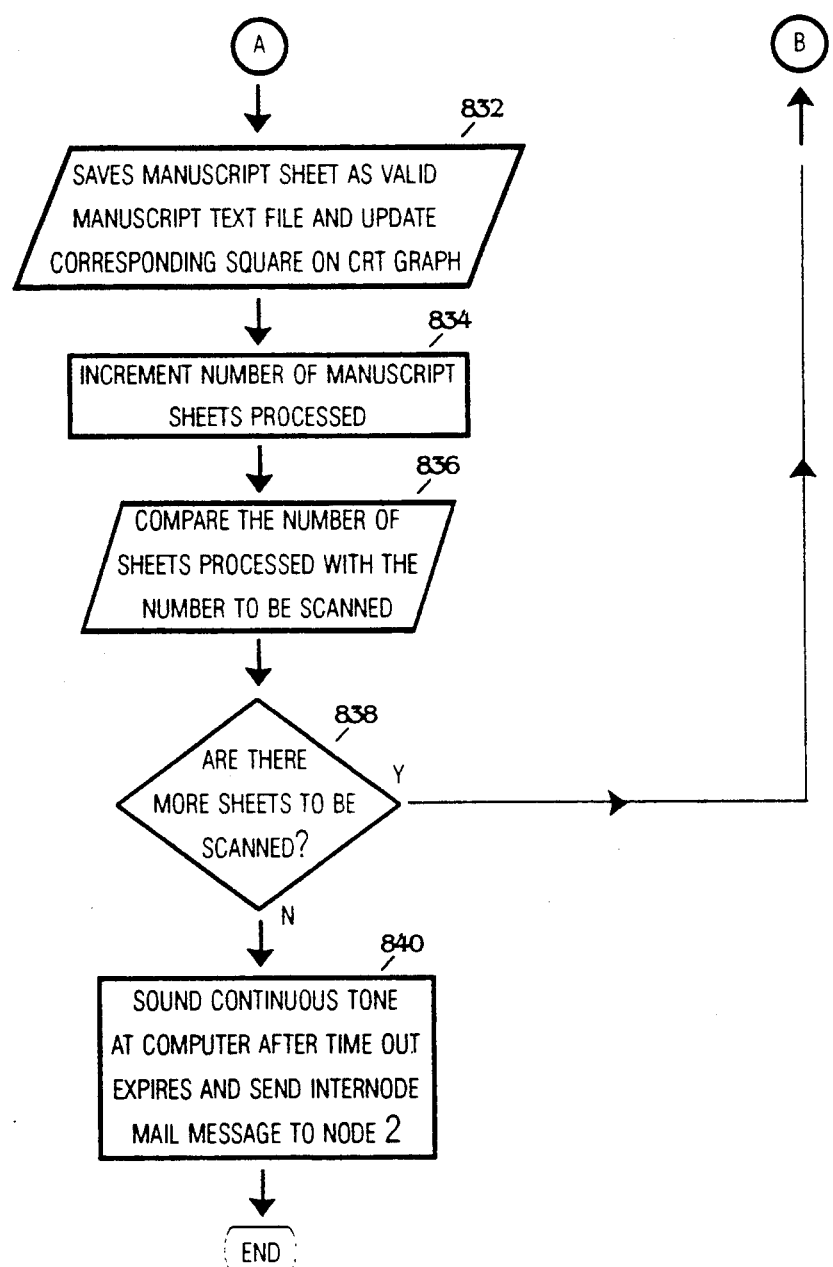
FIG. 8B is the remaining portion of the computer program flowchart of FIG. 8A.

A new publication actually starts with the creation of a new Node 3 database record in the business office in response to a customer order as explained further in connection with the Node 3 program of FIG. 2. Actual publication, however, starts with Node 1, the operation of which is illustrated in FIGS. 8A and 8B with the entry of original manuscript material either in the form of optically scanned typing sheets or corresponding data on a floppy disk. The Node 1 program 800 is explained in terms of data entry by way of a stack of typed sheets which are read by an optical scanner, but may be entered equivalently by floppy disk or other electronic data transfer means.

The Node 1 program enters at step 802 which determines if the first sheet scanned is the "Manuscript Begin Title Sheet". If no, step 804 waits for this sheet. If this initial sheet has not been entered before a predetermined time, an InterNode Message is sent to Node 2 and a continuous alarm tone is sounded to alert the operator to this occurrence. If the answer in step 802 is yes, step 806 creates the Manuscript Title "Mini-Control Data Field (MCDF)" which consists of the publication order number, customer city and state, and the number of typing sheets in the original manuscript material which is used thereafter to compare data on all succeeding scanned typing sheets for data validation at Node 1.

Step 806 also updates the CRT display on the operator monitor associated with Node 1 computer 14. This step builds a graph with the information taken from the Manuscript Begin Title Sheet and displays other useful information such as the running total of scanned sheets, running total of unrecognized characters, total bytes, total elapsed time, amount of time since the last sheet was scanned, and the amount of free computer memory available.

Step 808 then scans the next sheet of the original manuscript material and then step 810 asks whether the current sheet is the "Manuscript Title End Sheet" which signifies the last sheet in the stack of typing sheets. If no, step 812 compares the manuscript sheet MCDF with the publication title MCDF and then step 814 asks whether the latest scanned sheet belongs to this publication. If no, step 816 saves this sheet as an Error Sheet in an error file and then the program moves back to step 808 to scan the next sheet.

If the answer in step 810 is yes, step 818 asks whether all of the expected manuscript sheets have been processed. If yes, step 820 then creates and saves the manuscript data in the "Manuscript Title Information File" for this particular publication. Step 822 then sounds a continuous tone after a preset time and sends a InterNode Message to Node 2 indicating that the system is ready for entry of original manuscript material for another publication title.

If the answer in step 818 is no, then a sheet is missing from the manuscript material, and step 824 saves a blank manuscript Error File Sheet for each missing sheet which is used later by Node 2 to replace the missing information. The program then moves to step 820.

If the answer in step 814 is yes, the program moves to step 826 which compares the number field of this manuscript sheet to those already in memory for display on the Node 1 CRT graph. Step 828 then asks whether this current sheet is a duplicate of one already scanned. If yes, step 830 saves this sheet as a "Duplicate Error File". The program loops back to step 808 to enter the next manuscript sheet.

If the answer in step 828 is no, step 832 (FIG. 8B) saves the manuscript sheet as a valid manuscript sheet text file and updates the Node 1 CRT graph for this publication title. Step 834 then increments the number of manuscript sheets processed.

Next, step 836 compares the number of sheets processed with the number of sheets to be entered and step 838 asks whether additional sheets remain to be entered. If yes, the program loops back to step 808 (FIG. 8A) to enter the next manuscript sheet. If the answer in step 838 is no indicating that no more sheets remain to be entered, step 840 sends an InterNode mail message to Node 2 indicating that all of the original manuscript material has been entered for this publication title to indicate the system is ready for entry of another manuscript title, and sounds a continuous tone after a preset time delay.

NODE 2 PROGRAM (FIGS. 9-12B)

Figure 9:
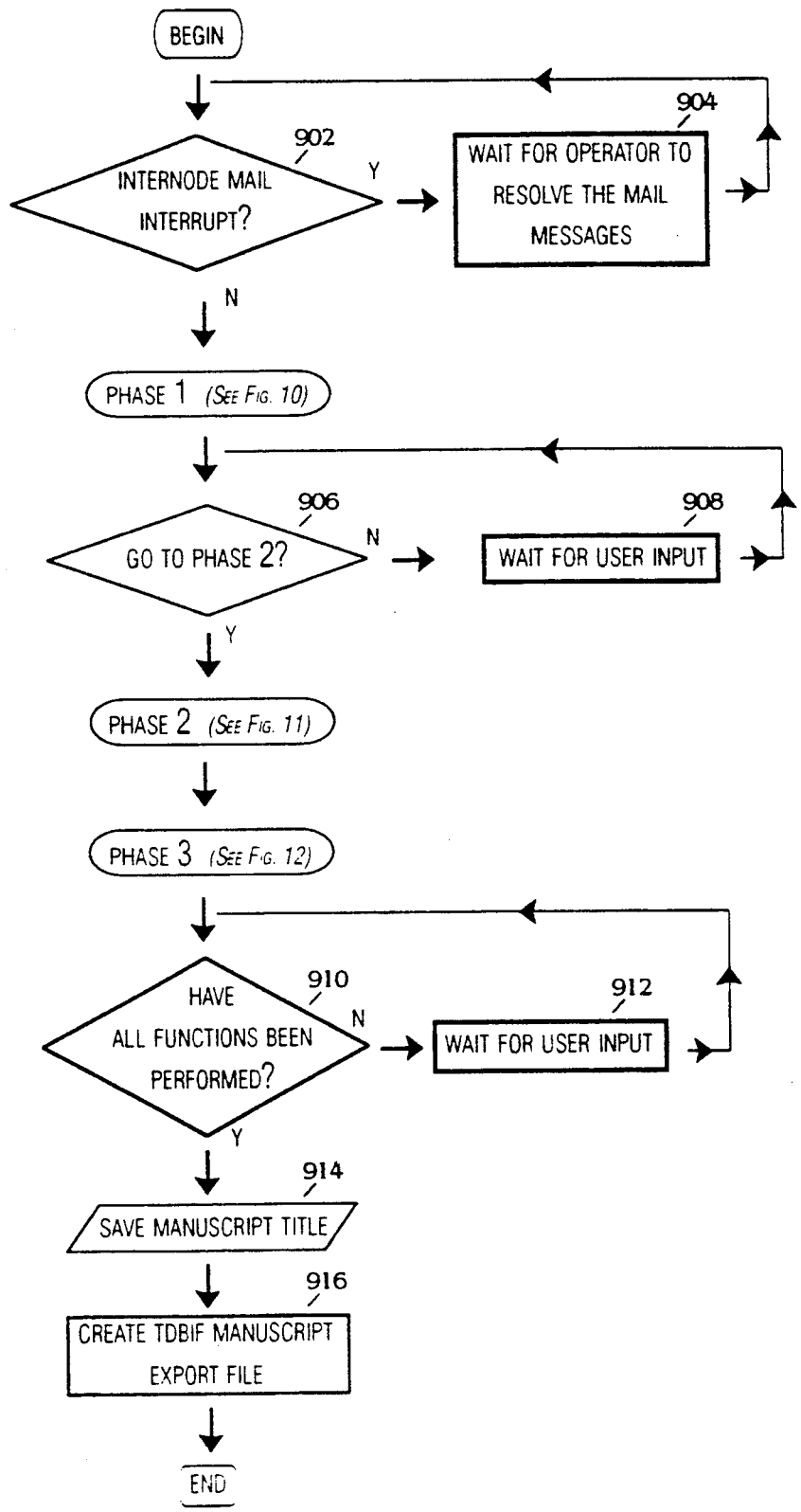
FIG. 9 is a computer program flowchart illustrating a general overview of the operation of Node 2.
Figure 11A:
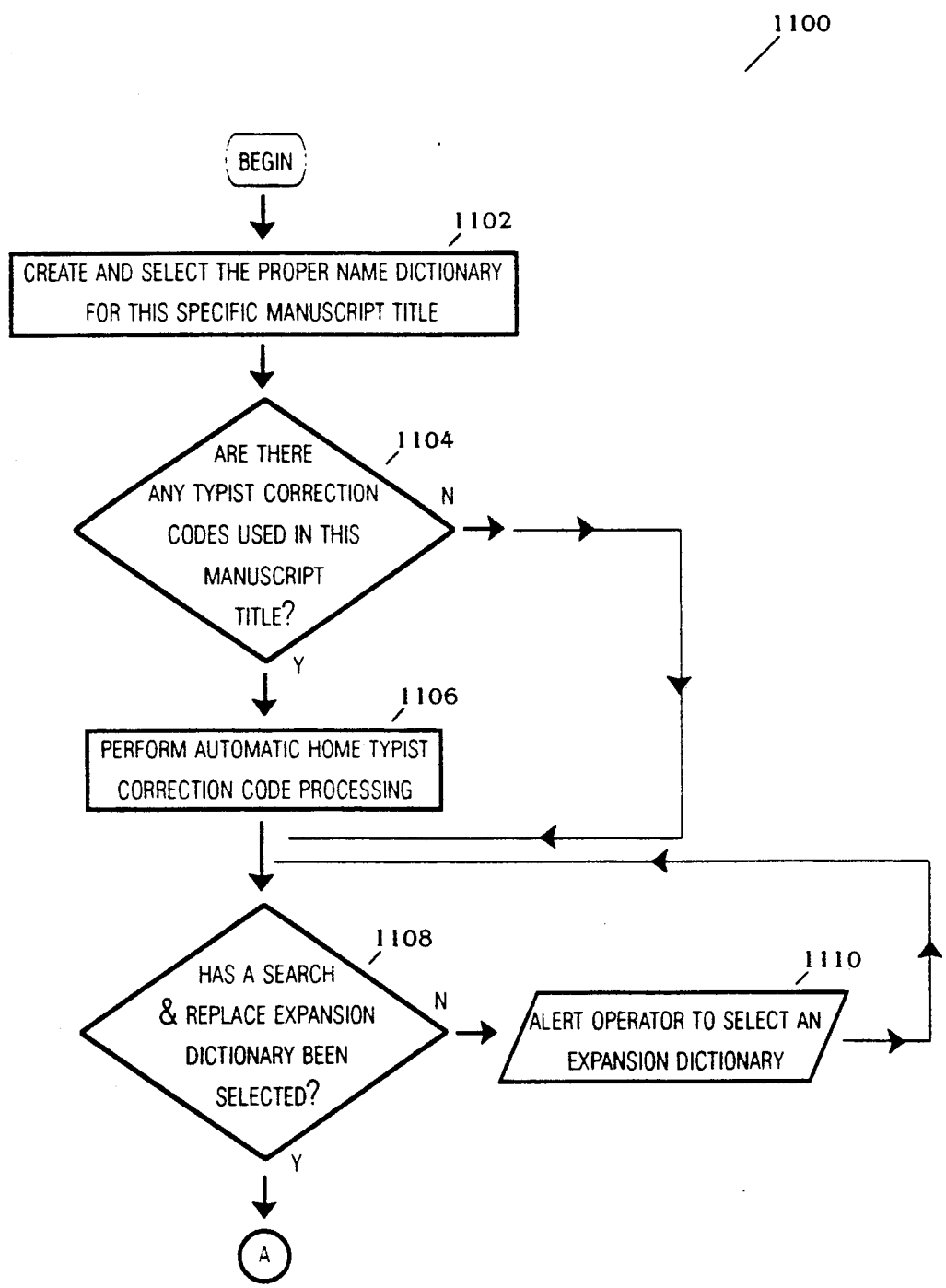
FIG. 11A is the first portion of a computer program flowchart illustrating phase 2 operation of Node 2.
Figure 11B:
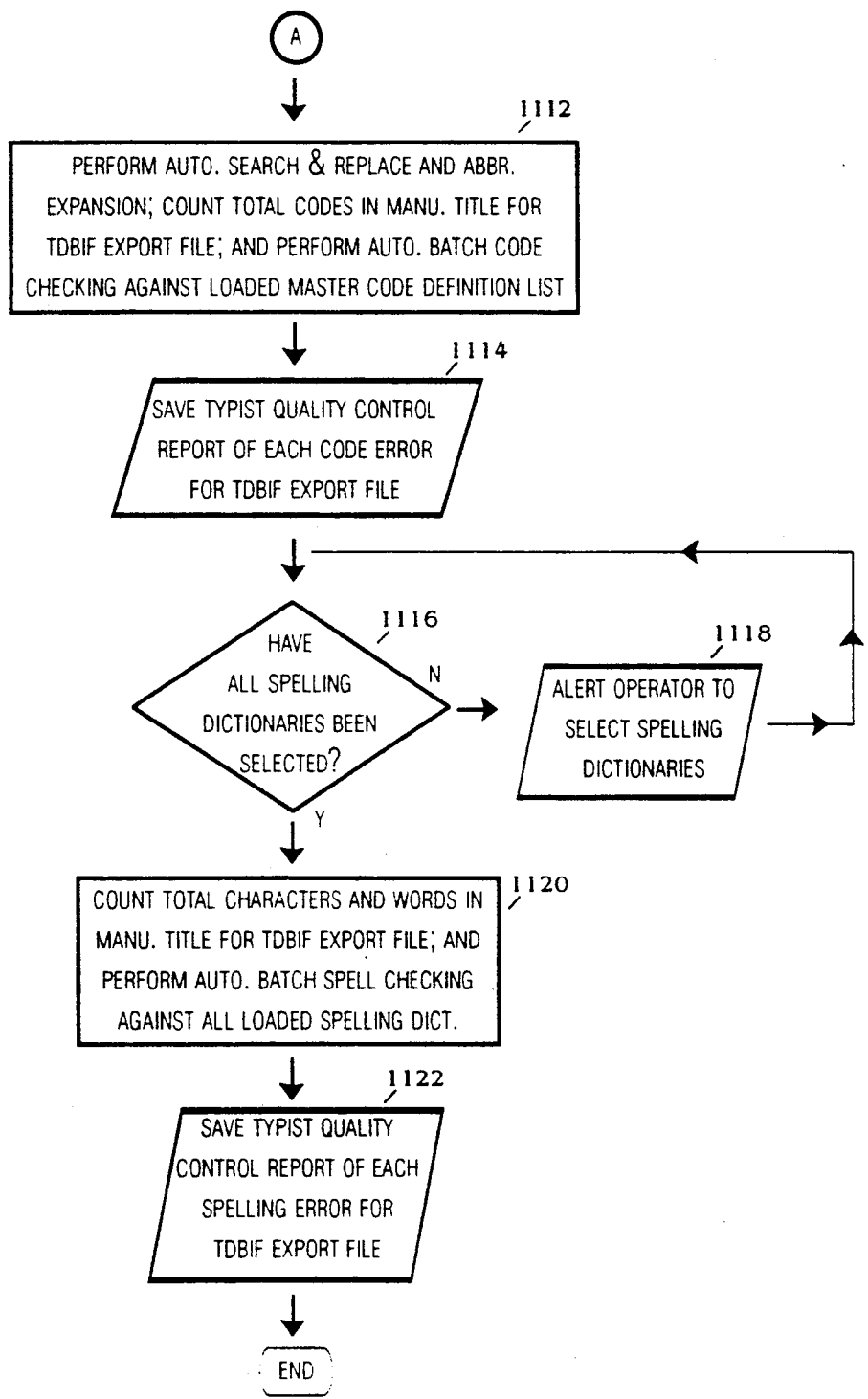
FIG. 11B is the remaining portion of a computer program flowchart of FIG. 11A.

The operation of Node 2 is divided into phases 1, 2 and 3 illustrated in FIGS. 9, 10A-B, 11A-B and 12A-B respectively. FIG. 9 presents a general overview of the operation of the Node 2 program. Initially, step 902 asks whether any InterNode Mail interrupts have been received. Such interrupts indicate an error condition or otherwise require the attention of an operator at Nodes 1 or 4. If such an interrupt has been received, the program moves to step 904 and waits for the operator to resolve the mail message and then loops back to step 902.

If no interrupts have been received, the program moves to Node 2 phase 1 program after which, step 906 asks whether business office authorization has been received to proceed to phase 2 of the program. If no, step 908 waits for operator authorization and then loops back to step 906. If the answer in step 906 is yes, the program proceeds through phases 2 and 3 and then asks in step 910 whether all of the operations have been performed as called for in these phases of the program. If no, step 912 waits for operator input and then loops back to step 910.

If the answer in step 910 is yes, step 914 saves the manuscript title and creates a "Title Data Base Information File" (TDBIF) Export File in step 916 which is a list of quality control and statistical data to be sent to Node 3.

NODE 2 PHASE 1 PROGRAM (FIGS. 10A-B)

Phase 1 program 1000 begins at step 1006 which looks for the "Master Publication Code Definition List." As explained further in connection with Code Definition Editor Program (FIG. 7), this Master Code Definition List includes all of the entity attribute codes. If this list was not found as asked in step 1008, step 1010 prompts the operator to provide a file location and the program loops back to step 1008.

If the answer in step 1008 is yes, step 1012 displays the selection of manuscript titles available for processing in this phase of the program, and prompts the operator to enter the title to be processed. In response, this file is loaded from memory.

Step 1014 then attempts to load the presaved Node 3 "Title Data Base Information File" (TDBIF) Import File for the selected title. As explained further in connection with Node 3, this file contains the appropriate customer information concerning the selected title to be processed. Step 1016 then asks whether this import file was found. If no, step 1018 alerts the operator to give the location of the file and the program then loops back to step 1016.

If the answer in step 1016 is yes, step 1020 then asks whether the selected title has been authorized for processing by the business office. This information is contained in the TDBIF Import File. If no, step 1022 alerts the operator to quit and save the title and the program then loops back to step 1012 (FIG. 10A) to prompt the operator to select another title for processing.

If the answer in step 1020 is yes, step 1024 displays the "Manuscript Title Control Window" on the CRT of computer 18 and step 1026 then asks whether any Manuscript Title Error Files have been saved for this title during the processing in Node 1. If yes, step 1028 prompts the operator to resolve these errors utilizing the text editor of Node 2 after which the program loops back to step 1026.

If there are no Manuscript Title Error Files, Step 1030 then enables the "go to phase 2 of Node 2" screen button prompting the operator to enter Phase 2 of the Node 2 program. In step 1034, the operator also has the option to quit and save this manuscript title after which phase 1 ends. If the answer in step 1032 is yes, the program moves to the Phase 2 Node 2 program.

NODE 2 PHASE 2 PROGRAM (FIGS. 11A-B)

Phase 2 enters at step 1102 which creates and loads the "Proper Name Dictionary" for this specific manuscript title saved from Node 1 of the system. This data will always be part of every manuscript. As will be appreciated, this prevents the program's spell-checking routines from stopping at proper names unique to the particular title.

Step 1104 then asks whether there are any "Typist Correction Codes" contained in the original manuscript material. These codes are defined in the Code Definition Editor explained in connection with FIG. 7. In the process of typing the original manuscript material, the typist can enter a correction code at the end of the typing sheets specific to a particular error rather than go back and revise the entire manuscript material. This can save a substantial amount of time thereby reduce preparation costs. These codes precede the replacement text which will prompt the retrieval and automatic insertion of the correct text in the proper location in the manuscript material. If the answer in step 1104 is yes, step 1106 performs the processing operations indicated by the correction codes.

If the answer in step 1104 is no, or after step 1106, step 1108 asks whether a search and replace "Expansion Dictionary" has been selected. This dictionary is a text file that includes a list of brand names and abbreviation pairs which are automatically replaced with the respective generic names, trade names or complete words. If the answer in step 1108 is no, step 1110 alerts the operator to select an Expansion Dictionary and the program then loops back to step 1108.

Figure 12A:
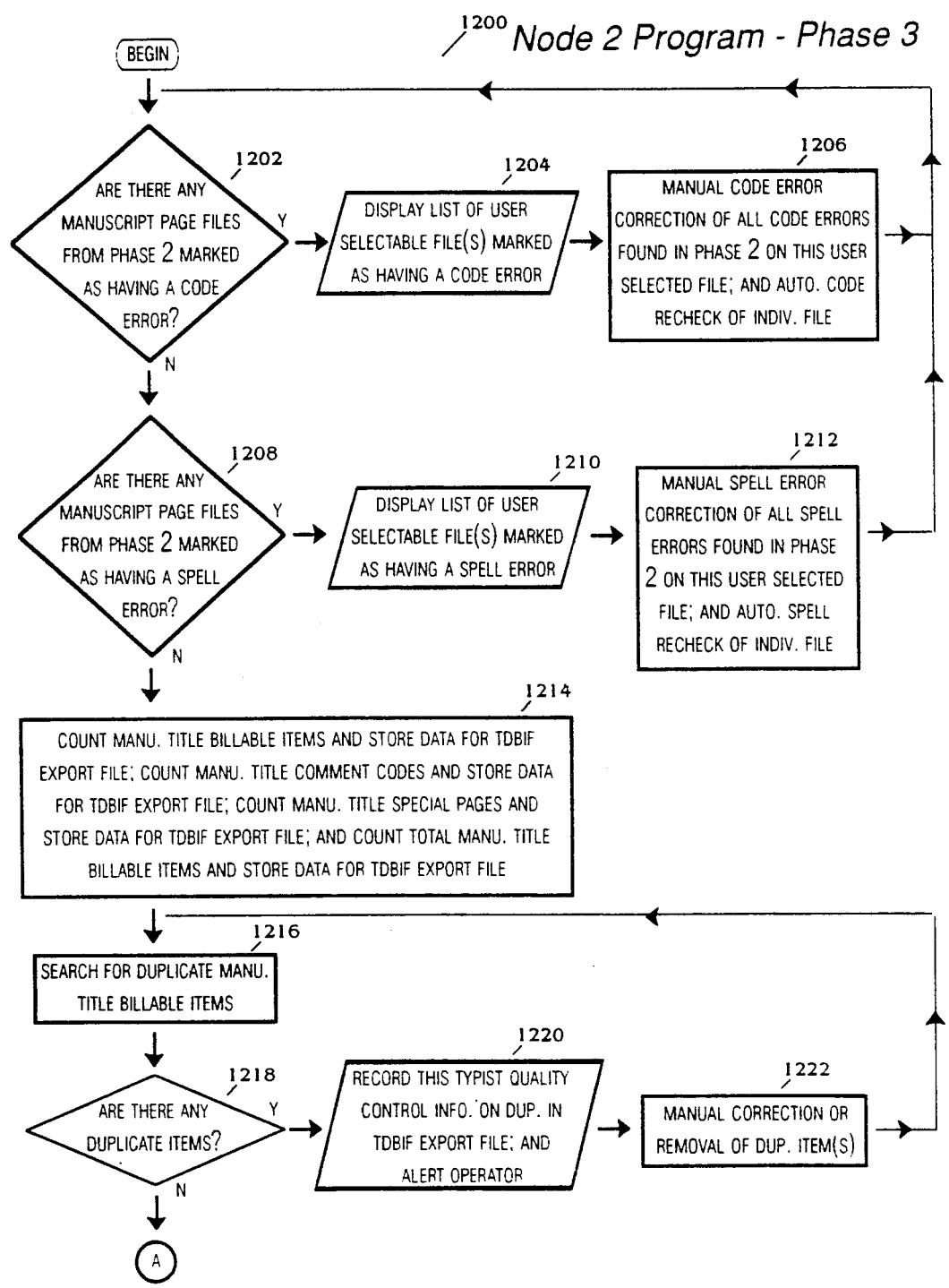
FIG. 12A is the first portion of the computer program flowchart illustrating phase 3 operation of Node 2.
Figure 12B:
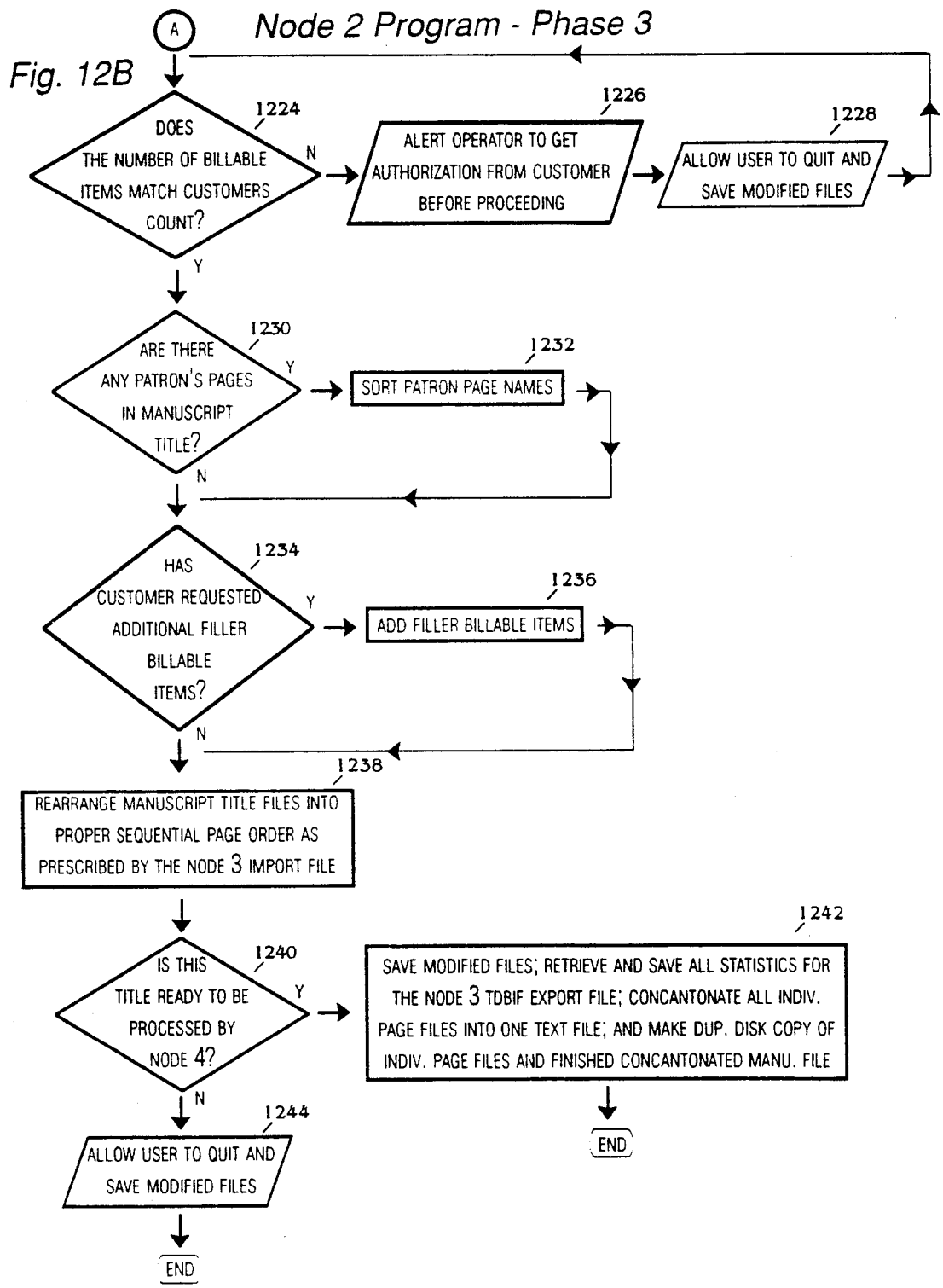
FIG. 12B is the remaining portion of a computer program flowchart of FIG. 12A.
Figure 15B:
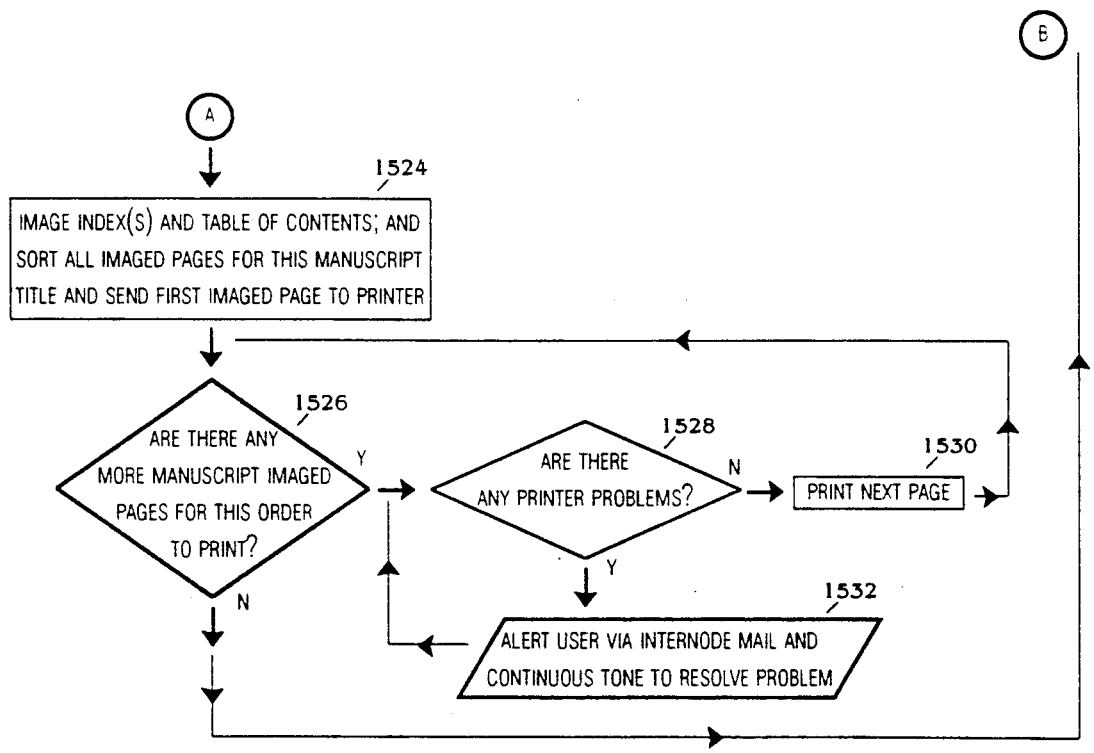
FIG. 15B is the remaining portion of a computer program flowchart of FIG. 15A.

If the answer in step 1108 is yes, step 1112 performs the search and replacement and abbreviation expansion processing operations. This step also counts the total codes of different types in the manuscript title for the TDBIF Export File. Additionally, step 1112 performs the automatic batch code checking against the Master Code Definition List and marks each file found with a code error for later manual operator correction in Node 2 phase 3 (FIGS. 12A-B). In other words, the codes in the original manuscript material are checked against the master list of codes and their further defined restricted use to determine whether the entered code has been used correctly. Typographical errors can occur when the typist enters these codes and this operation detects these. According to the Master Code Definition List, the codes can be required to be in a certain dedicated order such as those for recipe title, ingredient list, and method, can be required to be entered in association with other codes such as those with a Grouped Entity, and can restrict the text associated with that code to a predetermined length.

Step 1114 then prepares and saves a Typist Quality Control Report for any code errors found in step 1112 to the TDBIF Export File. In this way, the accuracy of the typist can be objectively monitored.

Step 1116 then asks whether all required spelling dictionaries have been selected. If no, step 1118 alerts the operator to select the spelling dictionaries and then loops back to step 1116.

If the answer in step 1116 is yes, step 1120 counts the total characters and words in the title for the TDBIF Export File, performs automatic batch spell-checking against all of the loaded spelling dictionaries and marks all manuscript title files found with spelling errors for later manual correction in phase 3 (FIGS. 12A-B). Step 1122 then saves a Typist Quality Control Report for the spelling errors found in the TDBIF Export File after which Phase 2 ends.

NODE 2 PHASE 3 PROGRAM (FIGS. 12A-B)

Program 1200 enters at step 1202 which asks whether any manuscript page files from Node 2 phase 2 have been marked with code errors. If yes, step 1204 displays a list of operator selectable files marked as having a code error. Step 1206 then allows the operator to correct the code errors of the selected file with its text editor and then performs an automatic code recheck of the selected file to confirm no new code errors have been introduced through the operator editing process. The program then loops back to step 1202 and continues through steps 1204 and 1206 until no more files are marked as having code errors.

When the answer in step 1202 is no, step 1208 asks whether any of the manuscript page files from Node 2 Phase 2 have been marked with spelling errors. If yes, step 1210 displays a list of operator selectable files having spelling erros. Step 1212 then allows operator correction of the spelling errors through its text editor and then automatically spell-checks the file again to confirm that no new spelling errors have been introduced through the operator editing process after which the program loops back to step 1202.

When there are no more spelling errors, the answer in step 1208 is no, and step 1214 then counts the "Manuscript Title Billable Items" for the business accounting department and stores this data in the TDBIF Export File. In some publications, such as cookbooks for example, the customer may be billed according to the number of recipes or pages. This processing operation counts the number of billable items for accounting purposes. Step 1214 also counts the "Manuscript Title Comment Codes" and characters associated with comment codes and stores this data in the TDBIF Export File. The Comment Codes identify a comment entity which may include an author's comments concerning a particular recipe such as "this hot drink is particularly good on cold snowy evenings." Additionally, this step counts the "Manuscript Title's Special Pages", if any, and also stores this data in the TDBIF Export File. Finally, step 1214 counts the "Total Manuscript Title Billable Items" and again stores this data in the TDBIF Export File.

In step 1216, the program searches for duplicate Manuscript Title Billable Items and then in step 1218 asks whether any duplicate billable items have been found. If yes, step 1220 records this duplicated billable item to the Typist Quality Control Report in the TDBIF Export File and alerts the system operator. Duplicate billing items might occur if the typist enters the same material twice. Step 1222 then allows the operator to correct or delete the duplicate billable items and the programs then loops back to step 1216.

When all of the duplicate billable items have been resolved, the answer in step 1218 is no, and the program moves to step 1224 which asks whether the number of billable items now existing in the actual manuscript title plus the number of filler billable items the customer has requested matches the customer's count of billable items within a certain percentage error factor. Billable items might include the number of recipes. If no, the operator is alerted in step 1226 to get authorization from the customer before proceeding. Step 1228 then allows the operator to quit and save the modified files and the program loops back to step 1224.

If the answer in step 1224 is yes, step 1230 asks whether any Patron's Pages are included in the manuscript title. A Patron's Page is a list of those individuals or businesses which may have sponsored the publication. If a Patron's Page is included in the publication, step 1232 sorts the Patron names into alphabetical order.

After step 1232, or if the answer in step 1230 is no, step 1234 asks whether the customer has requested additional billable filler items. This information is contained in the TDBIF Import file which reflects the customer's specifications for the publication. A filler item may include prestored recipes in specific categories or chapters of a cookbook. If filler items have been requested, step 1236 adds the requested number of billable filler items to the manuscript title.

After step 1236, or if the answer in step 1234 is no, step 1238 rearranges the "Manuscript Title Files" into proper sequential page order as prescribed by the Node 3 Import file. As will be appreciated, the original manuscript material for a given title may be entered in any page order, and in fact, entry of the original manuscript material may be created by a number of typists producing manuscript material in random order and may not even be typed on the basis of pages. But rather, the order of the finished printed manuscript is entered through the Node 3 TDBIF Import File. Step 1238 rearranges all of the original manuscript material into proper page sequence as defined in advance and stored in the Node 3 TDBIF Import File.

Step 1240 next determines if the manuscript title is ready for the processing operations of Node 4. In the event the answer in step 1240 is no, step 1244 allows the operator quit phase 3 and save the modified files. A yes answer indicates that this manuscript title has satisfied all of the initial criteria presented thus far in the program. In response, step 1242 saves the modified manuscript files, retrieves and saves all statistical information such as Typist Quality Control Reports and billable items for the Node 3 TDBIF Export File. This step then concatenates all individual page files into one text file for the imaging process of Node 4. Finally, step 1242 makes a duplicate disk copy of the individual page files and the finished concatenated manuscript file. Phase 3 then ends.

NODE 4 PROGRAM (FIGS. 13, 14 AND 15A-B

FIG. 13 illustrates a general overview of Node 4 programs 1400 and 1500. Node 4 is designed to continually "batch" process all available manuscript titles for validation in Phase 1 or imaging in Phase 2. The overview enters at step 1302 which asks whether there are any available manuscript titles to be validated in the Node 4 Phase 1 program 1400. If no, the program continues to loop through this step until manuscript material is available. If the answer in step 1302 is yes, the program executes Phase 1 for this manuscript material. In step 1304 the program asks if any additional manuscript titles are available for validation. If yes, the program loops back to step 1302.

If the answer in step 1304 is no, step 1306 then asks whether a manuscript is ready for imaging, that is to say, to be printed. If no, the program loops through the program until such is ready and moves to Phase 2 to execute the imaging operations. If yes, the program images the available manuscript title by processing in Phase 2 of Node 4. At the completion of Phase 2, the program in step 1308 checks if there are any other manuscript titles available for printing. If so, the program loops back to Phase 2.

Again, as those skilled in the art will appreciate and as further explained above in the PFU overview, running the Node 4 program with the same manuscript title file on multiple "sister clones" of Master Publication Format will yield multiple sets of finished camera-ready color separation art in perfect register with each other.

NODE 4 PHASE 1 PROGRAM (FIG. 14)

Node 4 phase 1 program 1400 basically confirms the availability of manuscripts to print or image, that all codes in the manuscript match codes contained in the predetermined "Master Publication Format", and that all external files required for merging with the manuscript title are available. Program 1400 enters at step 1402 which attempts to load the oldest available and completed Node 2 "Manuscript Title File." Step 1404 then asks whether a manuscript title has been loaded, that is, available to process.

If the answer in step 1404 is no, step 1406 continues to poll for available titles until the operator stops the process. In such an event, step 1408 alerts the operator at Node 2 by way of an InterNode Mail message that no manuscript titles are available for processing. The program then ends. If the operator does not stop the operation in step 1406, the program loops back to step 1402 when a manuscript title becomes available.

If the answer in step 1404 is yes, step 1410 loads and verifies the customer-chosen "Master Publication Format (PFU) file" with the codes contained within the text of the loaded Manuscript Title file. In this way, the attribute and entity codes are verified as valid.

Step 1412 then asks whether the codes match. If no, step 1414 alerts the operator to resolve the inconsistencies by way of an InterNode message to computer 18 (Node 2). The program then ends.

If the answer in step 1412 is yes, step 1416 attempts to verify the existence of all external page file path names, and of all graphic and filler text path names found in the Manuscript Title File. Step 1418 then asks whether the required path names to the external files exist. If no, step 1420 alerts the operator at Node 2 computer 18 to resolve the problem. The program then ends.

If the answer in step 1418 is yes, this file is marked as ready for imaging, and the program loops back to step 1402 to process or validate the next available manuscript title. When all manuscript titles have been processed, the program returns by way of the operator alert at step 1408.

NODE 4 PHASE 2 PROGRAM (FIGS. 15A-B)

In general, phase 2 program 1500 images the publication for printing by confirming and loading the specific "Master Publication Format File." This program enters at step 1502 which asks whether any manuscript titles are ready for imaging or printing. If no, the program moves to step 1504 which continues to poll for available manuscript titles until stopped by the operator, and alerts the operator at Node 2 and sounds of a continuous tone in step 1506 if no manuscripts are available. The program then ends. If a manuscript becomes available for imaging during step 1504, the program loops back to step 1502.

If manuscripts are available, the answer in step 1502 is yes, and step 1508 selects the oldest manuscript title for imaging and loads the PFU Master Publication Format File as selected by the customer associated with this publication. Step 1510 asks whether the "PFU Master Publication Format File printer page setup" matches the current printer setup. If no, step 1512 alerts the operator at Node 2 to resolve this problem and the program ends.

In the answer in step 1510 is yes, step 1514 matches the publication codes used on the currently selected "page" being imaged with the correct "Master Page Format" from within the "PFU Master Publication Format File." Step 1516 then verifies the availability of all "PFU Master Page" graphic files, increments the pagination counter, processes any selected index(es) and table(s) of content page information in memory, removes all publication codes from the data, and finally processes all text through the hyphenation dictionary.

Step 1518 then creates a new blank page and then "flows" all sequential text, dedicated and optional graphics, and optional text onto this page. The page is then imaged and saved for future printing.

Step 1520 then asks whether any more pages remain to be imaged. If yes, step 1522 selects the next page for processing. The program then loops back to step 1514 and continues to do so until no more pages remain to be imaged.

When all the pages have been imaged, step 1524 (FIG. 15B) images the table of contents and all selected indices for the publication according to the instructions contained in the PFU Master Publication Format File. This step also sorts the imaged pages in printing order and sends the first page to the printer.

Step 1526 then asks whether any imaged pages remain to be printed. If yes, step 1528 then asks whether any printer problems exist. If no, the next page is printed in step 1530 and the program loops back to step 1526. If printing problems have been encountered, if the answer in step 1528 is yes, step 1532 then alerts the operator at Node 2 computer 18, and the program loops back to step 1528. If the answer in step 1526 is no, the program loops back to step 1502 (FIG. 15A) to begin Phase 2 for another manuscript title, if available.

As those skilled in the art will appreciate, the present invention encompasses many variations in the preferred embodiment described herein. For example, each computer can perform more than one stage of processing operations and additionally, if production volumes justify, more than one computer can be used for each stage.

Having thus described the preferred embodiment of the present invention, the following is claimed as new and desired to be secured by Letters Patent:

1. A method of imaging a publication composed of manuscript material such as text and graphics, said method comprising the steps of:
   defining in a computer system the structure of a publication to be imaged to include a plurality of identifiable entities associable with manuscript material wherein said entities make up at least a portion of said structure, and assigning at least one imaging attribute to each entity;

receiving manuscript material along with entity-identifying information;

associating said material with ones of said entities identified by said information; and imaging said manuscript material associated with each of said entities according to said attributes assigned thereto, said imaging step including the steps of imaging said material in a signature format to include left and right hand pages, one of said entities being a page entity, one of said attributes associated with said page entity indicating whether manuscript material associated with another of said entities is allowed to continue from a right hand page to a left hand page, determining the presence of blank page space on a right hand page when continuance is disallowed to a left hand page, and retrieving filler manuscript material from computer memory stored therein unassociated with any particular publication and imaging said manuscript material in said blank page space.

2. The method as set forth in claim 1 further including the step of spell-checking said manuscript material after said receiving step.

3. The method as set forth in claim 1 further including, after said receiving step, the step of identifying certain manuscript items in said manuscript material and replacing said items with previously stored, respectively corresponding replacement items.

4. The method as set forth in claim 3, said manuscript items including selected abbreviations, said replacement items respectively including expansions of said abbreviations.

5. The method as set forth in claim 3, said manuscript items including selected trademarks, said replacement items respectively including generic equivalents of said trademarks.

6. An apparatus for imaging a publication composed of manuscript material such as text and graphics, said apparatus comprising:

a computer system including means for defining the structure of a publication to be imaged to include a plurality of identifiable entities associable with manuscript material wherein said entities make up at least a portion of said structure, and for assigning at least one imaging attribute to each entity, means for receiving manuscript material along with entity-identifying information, means for associating said material with ones of said entities identified by said information, and means for imaging said manuscript material associated with each of said entities according to said attributes assigned thereto, said imaging means including means for imaging said material in a signature format to include left and right hand pages, one of said entities being a page entity, one of said attributes associated with said page entity indicating whether manuscript material associated with another of said entities is allowed to continue from a right hand page to a left hand page, means for determining the presence of blank page space on a right hand page when continuance is disallowed to a left hand page, and means for retrieving filler manuscript material from computer memory stored therein unassociated with any particular publication and imaging said manuscript material in said blank page space.

7. The apparatus as set forth in claim 6 further including means for spell-checking said manuscript material.

8. The apparatus as set forth in claim 6 further including means for identifying certain manuscript items in said manuscript material and replacing said items with previously stored, respectively corresponding replacement items.

9. The apparatus as set forth in claim 8, said manuscript items including selected abbreviations, said replacement items respectively including expansions of said abbreviations.

10. The apparatus as set forth in claim 8, said manuscript items including selected trademarks, said replacement items respectively including generic equivalents of said trademarks.

11. A method of imaging a cook book for printing, the cook book including recipes with each recipe having a title, ingredient list, and recipe method, said method comprising the steps of:

defining in a computer system entities making up the structure of the cook book to include at least the entities of recipe and associated recipe title, ingredient list and method;

assigning an entity-identifying code to each of said entities and assigning at least one imaging attribute to each of said entities;

receiving manuscript material into said computer system including recipes and associated recipe titles, ingredient lists and methods identified by respective codes without any attribute information included in said manuscript material;

performing at least one processing operation on said manuscript material before imaging in accordance with said attributes; and imaging said manuscript material according to said attributes into a camera-ready signature page format to include left and right hand pages, one of said attributes indicating whether a recipe entity is allowed to continue from a right hand page to a left hand page, said imaging step including the steps of determining the presence of blank page space on a right hand page when continuance is disallowed to a left hand page, retrieving filler manuscript material from computer memory stored therein unassociated with any particular publication, and imaging said manuscript material in said blank page space, and searching the manuscript material associated with at least one of said recipe title entities for a predetermined food item word, retrieving in response to detection of said word a predetermined graphical icon stored in said computer system memory and unassociated with any particular publication and illustrative of said food item, and imaging said icon in association with the recipe of the recipe title having said word on the same page therewith.

* * * * *